US012798721B2

(12) United States Patent
Takeuchi

(10) Patent No.: US 12,798,721 B2
(45) Date of Patent: Nov. 17, 2026

(54) STRADDLE ELECTRIC VEHICLE

(71) Applicant: KAWASAKI MOTORS, LTD., Akashi (JP)

(72) Inventor: Hiroshi Takeuchi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 592 days.

(21) Appl. No.: 18/338,305

(22) Filed: Jun. 20, 2023

(65) Prior Publication Data

US 2024/0025513 A1 Jan. 25, 2024

(30) Foreign Application Priority Data

Jul. 25, 2022 (JP) ................................ 2022-118191

(51) Int. Cl.

| | |
|---|---|
| ***B62M 7/02*** | (2006.01) |
| ***B62J 43/16*** | (2020.01) |
| ***B62J 43/20*** | (2020.01) |
| ***B62J 43/28*** | (2020.01) |
| ***B62K 11/04*** | (2006.01) |
| ***B62K 19/40*** | (2006.01) |

(52) U.S. Cl.

CPC ................ *B62M 7/02* (2013.01); *B62J 43/16* (2020.02); *B62J 43/20* (2020.02); *B62J 43/28* (2020.02); *B62K 11/04* (2013.01); *B62K 19/40* (2013.01); *B62K 2204/00* (2013.01)

(58) Field of Classification Search

CPC ... B62M 7/02; B62J 43/16; B62J 43/20; B62J 43/28; B62K 11/04; B62K 19/40; B62K 2204/00

See application file for complete search history.

(56) References Cited

U.S. PATENT DOCUMENTS 7,438,149 B2 * 10/2008 Ishida .................... B62K 25/20 180/227
8,312,954 B2 * 11/2012 Johnson .................. B60L 50/66 280/281.1
8,556,018 B2 * 10/2013 Fujihara .................. B62J 43/16 180/220

(Continued)

FOREIGN PATENT DOCUMENTS

CN 103261015 A 8/2013
CN 114030549 A 2/2022

(Continued)

OTHER PUBLICATIONS

China National Intellectual Property Administration, Office Action and Search Report Issued in Application No. 202310725893.5, Dec. 25, 2025, 16 pages.

*Primary Examiner* — Timothy Wilhelm
(74) *Attorney, Agent, or Firm* — Alleman Hall LLP

(57) ABSTRACT

A straddle electric vehicle includes: a vehicle body frame including a head pipe inside which a steering shaft is located and a front frame extending rearward from the head pipe; a battery case supported by the vehicle body frame; and a motor case located behind the battery case and accommodating an electric motor that generates driving force by which a wheel is driven. The front frame includes at least one lower-rear supporting portion supporting a bottom surface of the battery case and at least one motor fixing portion adjacent to the lower-rear supporting portion and fixed to the motor case.

14 Claims, 15 Drawing Sheets

(56) References Cited

U.S. PATENT DOCUMENTS

| | | | | |
|---|---|---|---|---|
| 8,783,405 | B2 * | 7/2014 | Irie | B62K 11/04 180/312 |
| 8,919,482 | B2 * | 12/2014 | Matsuda | B62K 25/283 180/220 |
| 9,132,878 | B2 * | 9/2015 | Matsuda | B62K 19/32 |
| 9,346,421 | B2 * | 5/2016 | Miyashiro | H01M 50/271 |
| 9,463,695 | B2 * | 10/2016 | Matsuda | B60L 53/11 |
| 9,493,207 | B2 * | 11/2016 | Kawai | B62K 25/286 |
| 9,868,490 | B2 * | 1/2018 | Inoue | B62K 19/30 |
| 9,963,184 | B2 * | 5/2018 | Inoue | B62J 43/16 |
| 10,611,425 | B2 * | 4/2020 | Miyashiro | B60K 1/04 |
| 11,142,285 | B2 * | 10/2021 | Futamata | B62J 43/16 |
| 11,453,457 | B2 * | 9/2022 | Kugele | B62K 19/08 |
| 2006/0000655 | A1 | 1/2006 | Schless | |
| 2006/0283650 | A1 * | 12/2006 | Kawamura | B62K 19/06 180/219 |
| 2010/0133030 | A1 | 6/2010 | Johnson et al. | |
| 2011/0036657 | A1 | 2/2011 | Bland et al. | |
| 2011/0259660 | A1 * | 10/2011 | Johnson | B62M 7/06 180/220 |
| 2012/0111651 | A1 | 5/2012 | Irie et al. | |
| 2012/0241241 | A1 * | 9/2012 | Takamura | B62J 43/16 180/335 |
| 2013/0233634 | A1 * | 9/2013 | Matsuda | B62J 43/28 180/220 |
| 2013/0270021 | A1 | 10/2013 | Kubanek et al. | |
| 2013/0292198 | A1 | 11/2013 | Matsuda | |
| 2014/0305729 | A1 * | 10/2014 | Testoni | B62J 43/16 180/220 |
| 2014/0339008 | A1 * | 11/2014 | Matsuda | B62K 11/04 180/220 |
| 2015/0008061 | A1 * | 1/2015 | Matsuda | B60L 3/0061 180/220 |
| 2015/0075889 | A1 * | 3/2015 | Eguchi | B62J 43/28 180/220 |
| 2015/0122568 | A1 | 5/2015 | Eguchi | |
| 2015/0329176 | A1 * | 11/2015 | Inoue | H01M 50/249 180/220 |
| 2016/0280306 | A1 | 9/2016 | Miyashiro et al. | |
| 2016/0347199 | A1 * | 12/2016 | Mochizuki | B62K 25/283 |
| 2024/0025509 | A1 * | 1/2024 | Takeuchi | B62J 43/20 |
| 2024/0383569 | A1 * | 11/2024 | Narumi | B62K 25/283 |

FOREIGN PATENT DOCUMENTS

| | | | | |
|---|---|---|---|---|
| EP | 2096023 | A2 | 9/2009 | |
| EP | 2210803 | A2 | 7/2010 | |
| EP | 4279366 | A1 | 11/2023 | |
| JP | 2017178268 | A * | 10/2017 | B62K 11/04 |
| WO | 2015068753 | A1 | 5/2015 | |

* cited by examiner

STRADDLE ELECTRIC VEHICLE

CROSS-REFERENCE TO RELATED APPLICATION

This application claims priority to and the benefit of Japanese Patent Application No. 2022-118191 filed on Jul. 25, 2022, the entire disclosure of which is incorporated herein by reference.

BACKGROUND OF THE INVENTION

Field of the Invention

The present disclosure relates to a straddle electric vehicle.

Description of the Related Art

International Publication No. 2015/068753 discloses a straddle electric vehicle including a wheel that is driven by driving force of an electric motor driven by electric power from a battery.

To increase a cruising distance, an adequate number of batteries need to be mounted on a vehicle. When a total weight of the batteries increase, a structure that supports the batteries needs to be strengthened, and this increases the size of a vehicle body frame.

SUMMARY OF THE INVENTION

An object of the present disclosure is to suppress an increase in size of a vehicle body frame and suitably support a battery case.

A straddle electric vehicle according to one aspect of the present disclosure includes: a vehicle body frame including a head pipe inside which a steering shaft is located and a front frame extending rearward from the head pipe; a battery case supported by the vehicle body frame; and a motor case located behind the battery case and accommodating an electric motor that generates driving force by which a wheel is driven. The front frame includes at least one lower-rear supporting portion supporting a bottom surface of the battery case and at least one motor fixing portion adjacent to the lower-rear supporting portion and fixed to the motor case.

A straddle electric vehicle according to another aspect of the present disclosure includes: a vehicle body frame including a head pipe inside which a steering shaft is located and a front frame extending rearward from the head pipe; and a battery case that is supported by the vehicle body frame, is inclined relative to a vertical direction, and extends toward a front-lower side. The front frame includes a lower-rear supporting portion supporting a rear end portion of a lower surface of the battery case.

DESCRIPTION OF THE PREFERRED EMBODIMENTS

Hereinafter, an embodiment will be described with reference to the drawings. Directions used in the following description are based on directions from the viewpoint of a rider who rides a straddle electric vehicle 1, i.e., who is in a driving state. A front-rear direction corresponds to a vehicle longitudinal direction, and a left-right direction corresponds to a vehicle width direction.

Figure 1:
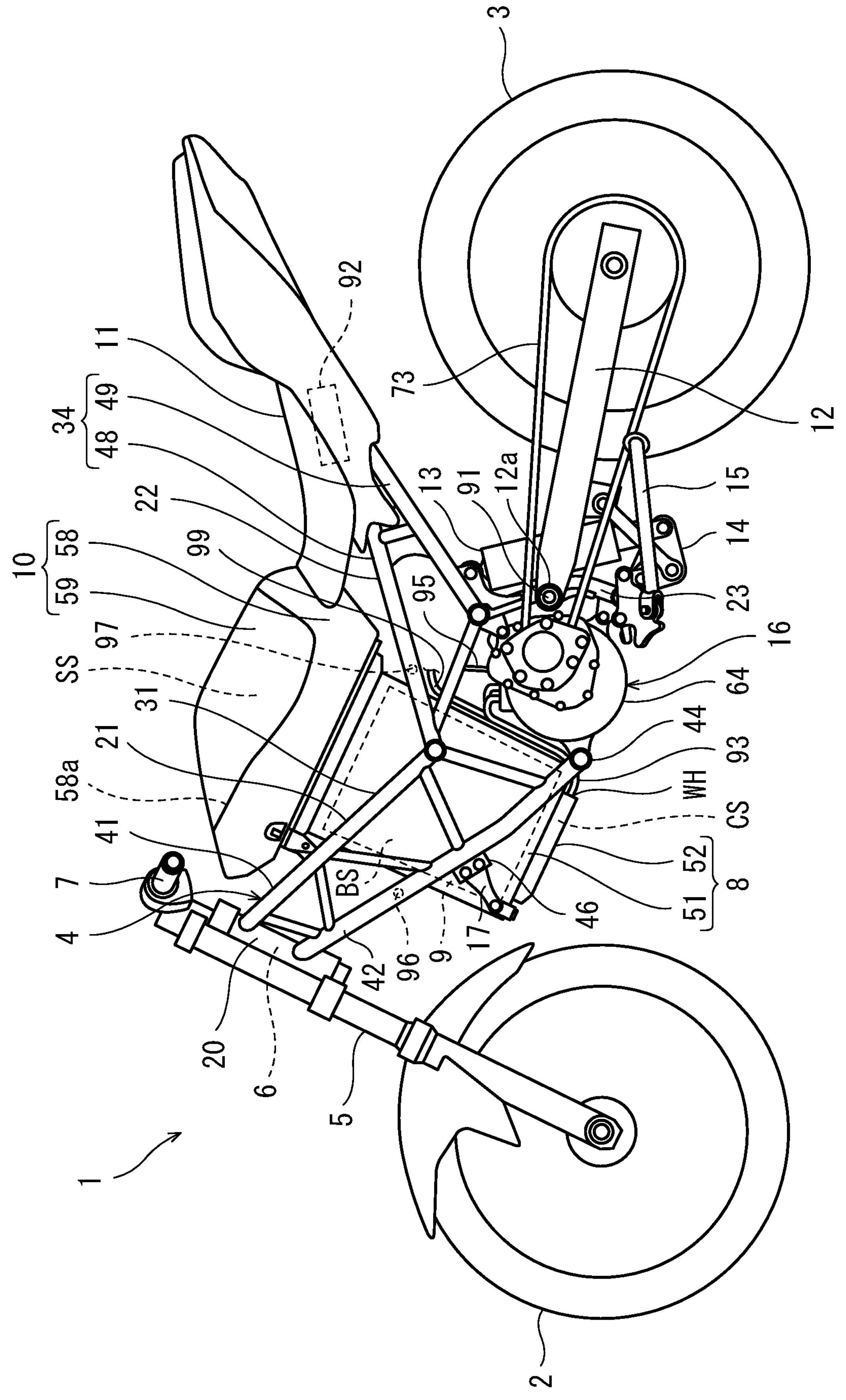
FIG. 1 is a left side view of a straddle electric vehicle according to an embodiment.
Figure 2:
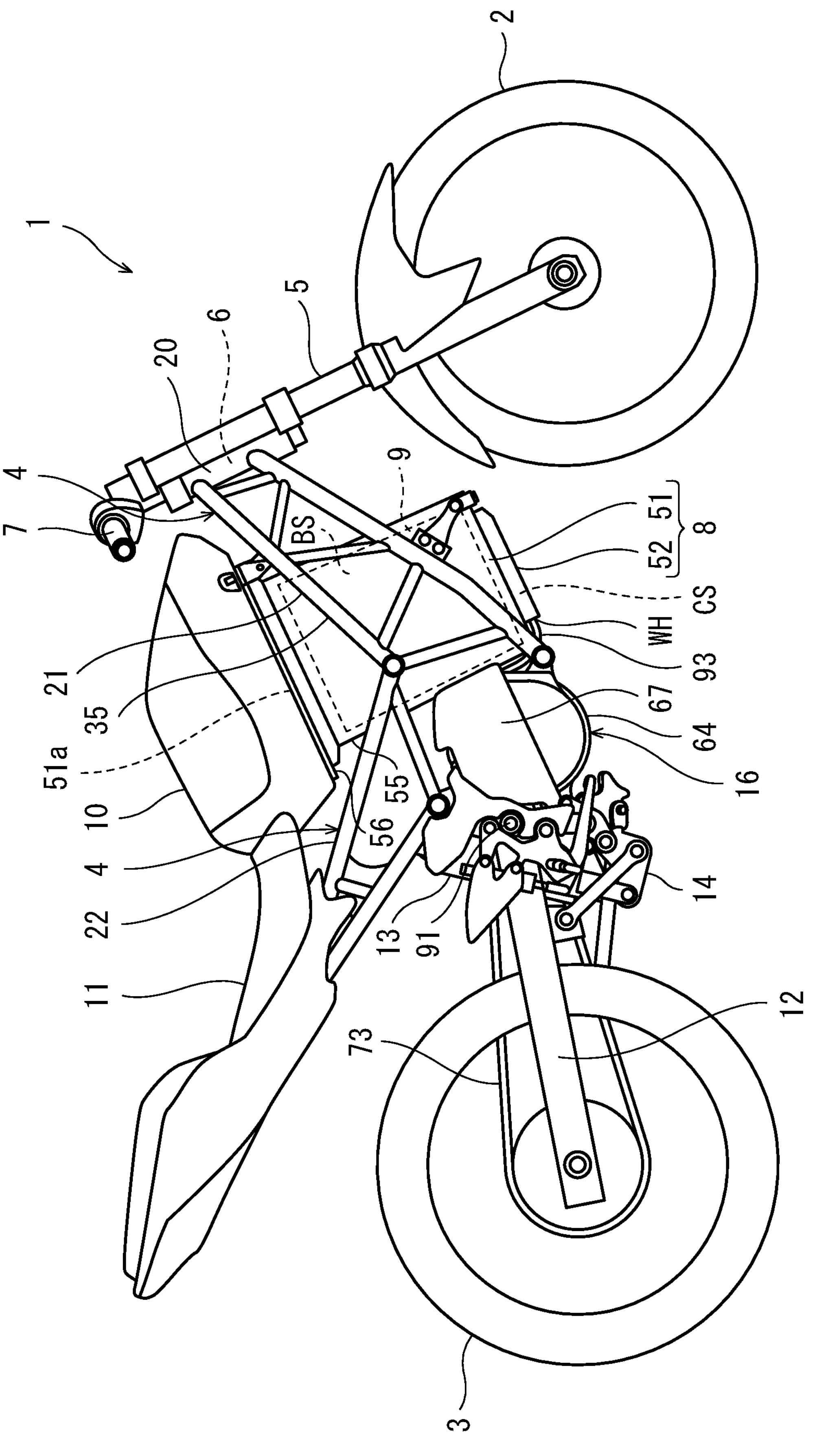
FIG. 2 is a right side view of the vehicle of FIG. 1.

FIG. 1 is a left side view of the straddle electric vehicle 1 according to the embodiment. FIG. 2 is a right side view of the vehicle of FIG. 1. As shown in FIG. 1, the vehicle 1 is a straddle vehicle including a seat ridden by a rider and is also an electric vehicle including an electric motor as a prime mover that generates driving force for traveling. The vehicle 1 does not include an internal combustion engine. In the present embodiment, the vehicle 1 is a motorcycle. However, the vehicle 1 may be another type of straddle vehicle, such as an automatic three-wheeled vehicle.

The vehicle 1 incudes a front wheel 2 and a rear wheel 3. For example, the front wheel 2 is a driven wheel, and the rear wheel 3 is a driving wheel. The front wheel 2 and the rear wheel 3 support a vehicle body frame 4. The front wheel 2 is in connection with a front portion of the vehicle body frame 4 through a front fork 5 as a front suspension. A steering shaft 6 is in connection with the front fork 5. The steering shaft 6 is inserted into a head pipe 20 of the vehicle body frame 4 so as to be angularly displaceable. A handle 7 grasped with hands of the rider is in connection with the steering shaft 6.

A battery case 8 and a motor unit 16 are located between the front wheel 2 and the rear wheel 3. The battery case 8 and the motor unit 16 are supported by the vehicle body frame 4. The battery case 8 defines a battery accommodating space BS accommodating a battery 9. An upper cover 10 is attached to the battery case 8 from above. The upper cover 10 is located behind the handle 7 and above the vehicle body frame 4. The upper cover 10 is fixed to the vehicle body frame 4 through a bracket. To be specific, the battery case 8 is fixed to the vehicle body frame 4 through the upper cover 10.

The upper cover 10 includes a base 58 and a lid 59. The base 58 is attached to an upper portion of the battery case 8.

The base 58 defines a storage space SS. The base 58 includes an opening 58*a* through which the storage space SS is open upward. The lid 59 is attached to the base 58 so as to be able to open and close the opening 58*a* of the base 58.

A seat 11 on which the rider is seated is located behind the upper cover 10. The seat 11 is supported by the vehicle body frame 4. The rear wheel 3 is in connection with the vehicle body frame 4 through a swing arm 12. A pair of front end supporting portions 12*a* of the swing arm 12 are in connection with a pivot frame 23 of the vehicle body frame 4 through a pivot shaft 91, extending in the left-right direction, so as to be turnable. The motor unit 16 is located behind the battery case 8 and in front of the pivot shaft 91. The motor unit 16 is located between a front frame 21 and the pivot frame 23. The motor unit 16 is located at a position close to the pivot shaft 91. To be specific, the motor unit 16 is located at a relatively low position in the vehicle 1.

The driving force output by the motor unit 16 is transmitted to the rear wheel 3 through a chain 73. The swing arm 12 is in connection with the vehicle body frame 4 through a rear suspension 13 as a shock absorber. The rear suspension 13 extends in the upper-lower direction. An upper end portion of the rear suspension 13 is coupled to the vehicle body frame 4, and a lower end portion of the rear suspension 13 is coupled to the vehicle body frame 4 through a suspension link 14. A side stand 15 is attached to a lower-left end portion of the pivot frame 23 of the vehicle body frame 4.

The vehicle 1 includes a controller 92 that is an ECU which controls the motor unit 16. The controller 92 is located in an accommodating space formed under the seat 11. The controller 92 controls an electric motor 68 in accordance with a predetermined program based on accelerator operation of the rider, a battery remaining amount, and the like. Specifically, in accordance with a predetermined program, the controller 92 gives an operation command to an inverter 69 that supplies electric power to the electric motor 68.

Figure 3:
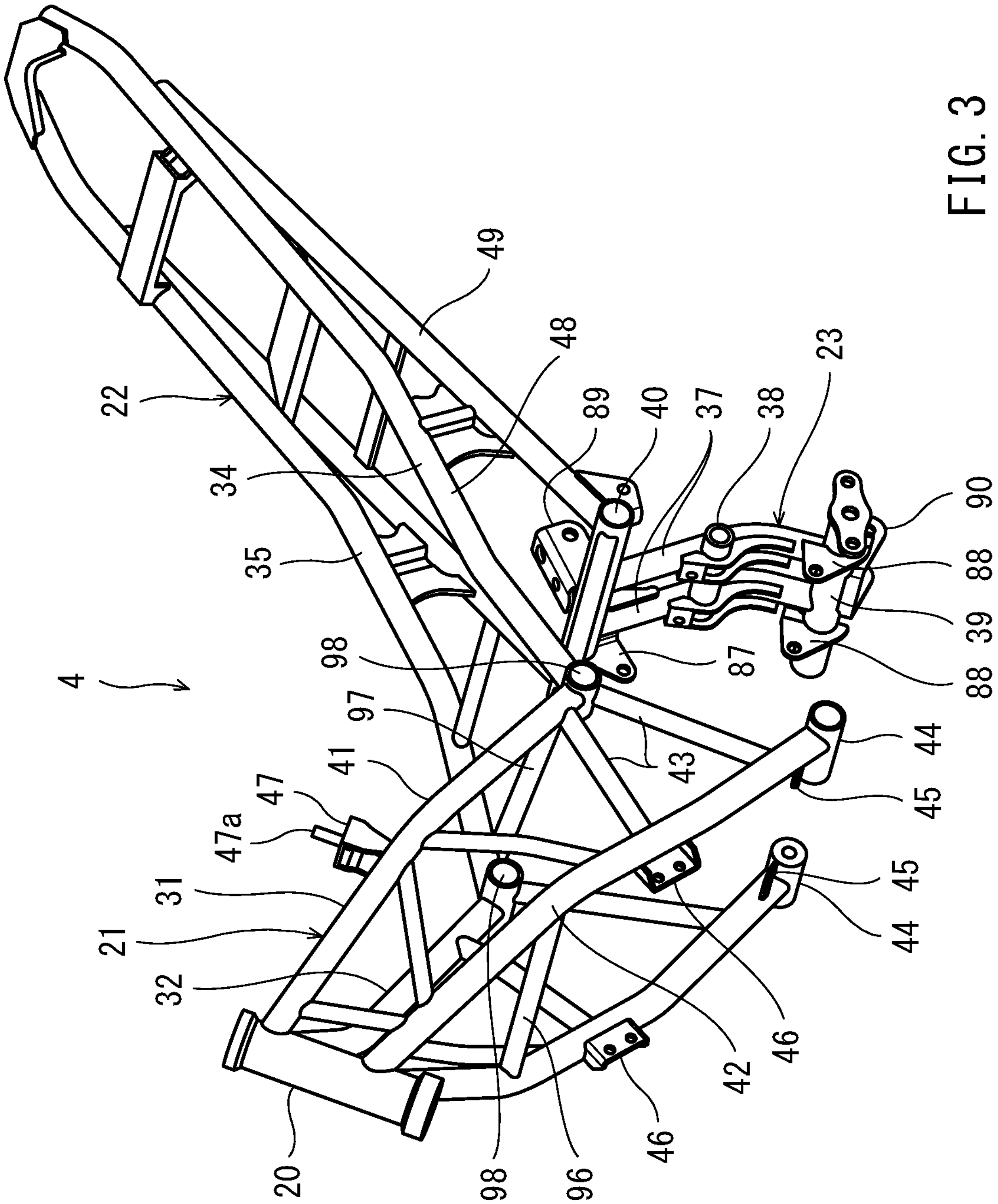
FIG. 3 is a perspective view of a vehicle body frame of FIG. 1 when viewed from a front-left side.

FIG. 3 is a perspective view of the vehicle body frame 4 of FIG. 1 when viewed from a front-left side. Hereinafter, the vehicle body frame 4 will be described mainly with reference to FIG. 3 (and suitably with reference to FIGS. 1 and 2). The vehicle body frame 4 includes the head pipe 20, the front frame 21, a rear frame 22, and the pivot frame 23. The front frame 21 extends from the head pipe 20 to a lower-rear side. The front frame 21 includes a left frame 31 and a right frame 32 which respectively project from the head pipe 20 in the left direction and the right direction and are located away from each other in the left-right direction.

The rear frame 22 includes: a left frame 34 connected to the left frame 31 of the front frame 21; and a right frame 35 connected to the right frame 32 of the front frame 21. The left frames 31 and 34 are included in a left frame of the vehicle body frame 4, and the right frames 32 and 35 are included in a right frame of the vehicle body frame 4. The left frame 31 and the right frame 32 of the front frame 21 are substantially bilaterally symmetrical, and the left frame 34 and the right frame 35 of the rear frame 22 are substantially bilaterally symmetrical. Therefore, the following will mainly describe the left frames 31 and 34.

The left frame 31 of the front frame 21 includes an upper longitudinal frame 41 and a lower longitudinal frame 42. The upper longitudinal frame 41 extends from an upper portion of the head pipe 20 to the lower-rear side. The lower longitudinal frame 42 extends from a lower portion of the head pipe 20 to the lower-rear side and is located away from the upper longitudinal frame 41 toward a lower side. The upper longitudinal frame 41 and the lower longitudinal frame 42 are coupled to each other by bridge frames 43 in a truss manner. To be specific, the front frame 21 includes a truss structure. In other words, the front frame 21 has such a shape that triangular frames or substantially triangular frames are lined up in the front-rear direction. The upper longitudinal frame 41, the lower longitudinal frame 42, and the bridge frames 43 are round pipes.

Figure 7:
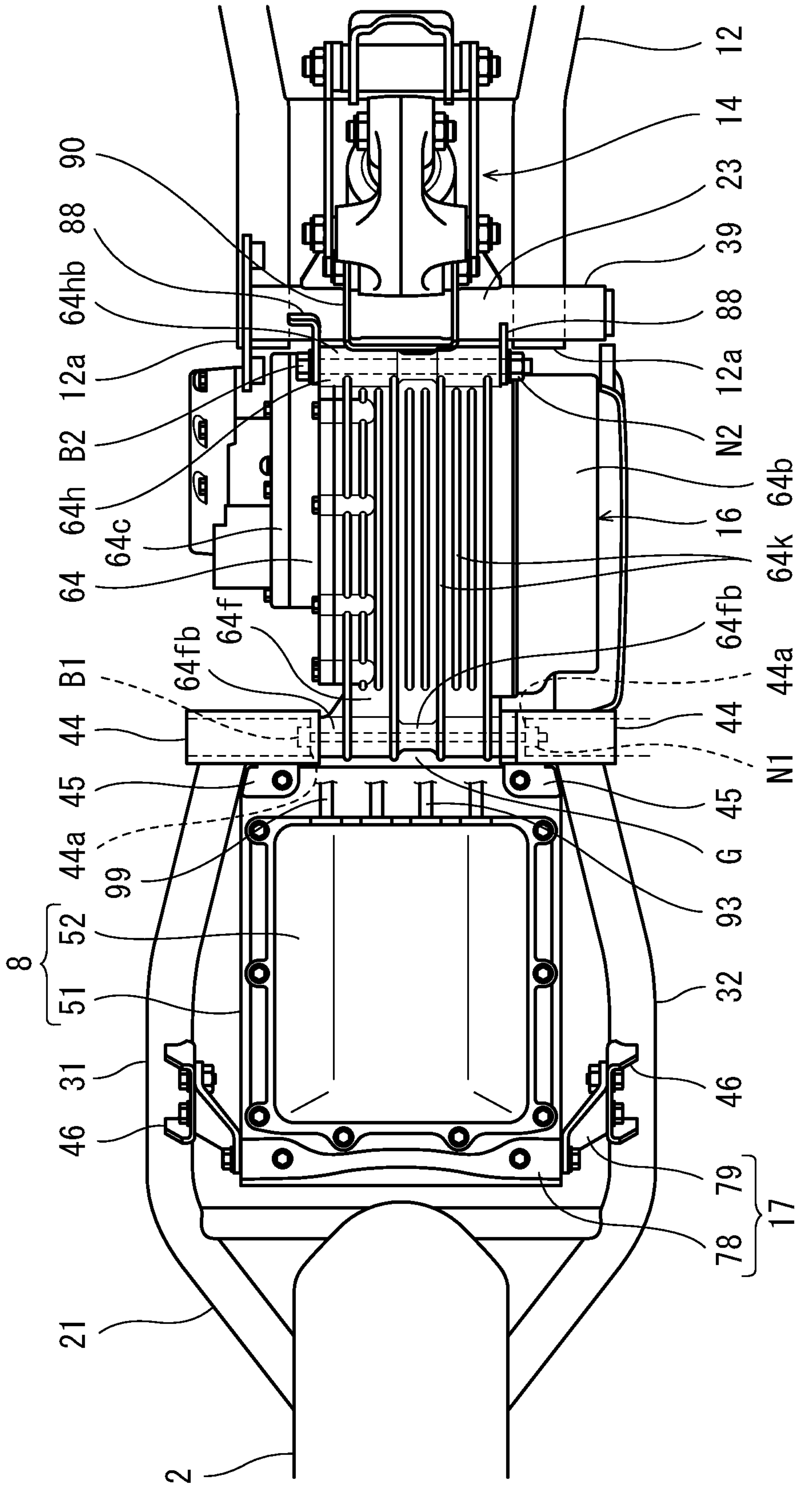
FIG. 7 is a bottom view of major components of the vehicle of FIG. 1.

A motor fixing portion 44 is located at a rear end of the lower longitudinal frame 42 (see also FIG. 7). The motor fixing portion 44 projects inward in the left-right direction from the rear end of the lower longitudinal frame 42. The motor fixing portion 44 has a bottomed cylindrical shape extending in the left-right direction. A plate-shaped lower-rear supporting portion 45 is welded to the motor fixing portion 44. The lower-rear supporting portion 45 is welded to a portion of the motor fixing portion 44 which projects inward in the left-right direction from the lower longitudinal frame 42. The lower-rear supporting portion 45 is also welded to the lower longitudinal frame 42.

As above, two sides of the lower-rear supporting portion 45 are fixed to the respective portions of the vehicle body frame 4. Specifically, a side extending in the vehicle width direction and a side extending in the front-rear direction in the lower-rear supporting portion 45 are fixed to the respective portions of the vehicle body frame 4. The lower-rear supporting portion 45 is located in front of the motor fixing portion 44 and at an inner side of the lower longitudinal frame 42 in the left-right direction. The lower-rear supporting portion 45 is located adjacent to the motor fixing portion 44. The lower-rear supporting portion 45 includes a bolt hole. The bolt hole of the lower-rear supporting portion 45 is located at a vehicle width direction outer side of a vehicle width direction inner end of a portion of the lower-rear supporting portion 45 which is welded to the motor fixing portion 44. The bolt hole of the lower-rear supporting portion 45 is located at a rear side of a front end of a portion of the lower-rear supporting portion 45 which is welded to the lower longitudinal frame 42.

The lower-rear supporting portion 45 is located parallel to the inclination of a lower surface of the battery case 8 such that the lower surface of the battery case 8 can be mounted on the lower-rear supporting portion 45 as described later. To be specific, the lower-rear supporting portion 45 is inclined so as to extend toward a rear-lower side and is fixed to the lower longitudinal frame 42 and the motor fixing portion 44. Moreover, since the lower longitudinal frame 42 is inclined so as to extend toward the rear-lower side, the welding length of the lower-rear supporting portion 45 welded to the lower longitudinal frame 42 can be increased as much as possible more than when the lower longitudinal frame 42 extends vertically. Furthermore, a coupling portion (coupling body 98) that couples the bridge frames 43, the upper longitudinal frame 41, and a seat frame 48 is located above the lower-rear supporting portion 45 in the vertical direction. Therefore, the lower-rear supporting portion 45 is stably supported from above.

A lower-front support bracket 46 projecting from the lower longitudinal frame 42 to a front-lower side is joined to an intermediate portion of the lower longitudinal frame 42. An upper-front supporting portion 47 projecting upward from the upper longitudinal frame 41 is joined to an intermediate portion of the upper longitudinal frame 41. A projection 47*a* projecting upward is located at the upper-front supporting portion 47. Similarly, the right frame 32 includes the upper longitudinal frame 41, the lower longitudinal frame 42, the bridge frame 43, the motor fixing portion 44, the lower-rear supporting portion 45, the lower-front support bracket 46, and the upper-front supporting portion 47.

The left frame 34 of the rear frame 22 includes the seat frame 48 and a support frame 49. The seat frame 48 extends from the intermediate portion of the upper longitudinal frame 41 of the front frame 21 to an upper-rear side. The support frame 49 extends from a rear end portion of the upper longitudinal frame 41 of the front frame 21 to the upper-rear side. The support frame 49 is located under the seat frame 48 and is inclined relative to a horizontal direction more than the seat frame 48. A rear end portion of the support frame 49 is in connection with a rear portion of the seat frame 48. Similarly, the right frame 35 includes the seat frame 48 and the support frame 49.

The intermediate portions of the pair of left and right upper longitudinal frames 41 of the front frame 21 and the front end portions of the pair of left and right seat frames 48 of the rear frame 22 are in connection with each other through a pair of coupling bodies 98. The coupling body 98 joined to the left frames 31 and 34 and the coupling body 98 joined to the right frames 32 and 35 are located away from each other in the left-right direction and are located at lateral sides of the battery case 8 (see FIG. 1) in the left-right direction. Rear ends of the pair of left and right lower longitudinal frames 42 of the front frame 21 and front ends of the pair of left and right support frames 49 of the rear frame 22 are in connection with each other through one cross frame 40 extending in the left-right direction.

The pivot frame 23 is located behind the front frame 21. The pivot frame 23 projects downward from the cross frame 40. The pivot frame 23 includes a pair of vertical frames 37, a pivot support pipe 38, a lower cross frame 39, a pair of motor fixing portions 87, and a pair of motor fixing portions 88. The pair of vertical frames 37 are lined up in the left-right direction and extend in the upper-lower direction. An interval between the pair of vertical frames 37 in the left-right direction is smaller than the dimension of a motor case 64 (see FIG. 1) in the left-right direction. Each of the vertical frames 37 has a curved shape that is convex toward a rear side.

The pivot support pipe 38 is welded to intermediate portions of the pair of vertical frames 37 and extends in the left-right direction. The pivot support pipe 38 projects toward both sides in the left-right direction beyond the pair of vertical frames 37. The pivot shaft 91 (see FIG. 1) is inserted into the pivot support pipe 38. The lower cross frame 39 is welded to lower end portions of the pair of vertical frames 37 and extend in the left-right direction.

The pair of motor fixing portions 87 located away from each other in the left-right direction are fixed to upper portions of the pair of vertical frames 37. Each of the motor fixing portions 87 is, for example, a plate-shaped bracket including a bolt hole directed in the left-right direction. The motor fixing portions 87 project forward from the vertical frames 37. To facilitate attaching and detaching of the motor unit 16, at least one of the motor fixing portions of the vehicle body frame 4 is detachable from a remaining portion of the vehicle body frame 4. Specifically, one of the pair of motor fixing portions 87 is detachable from the remaining portion of the vehicle body frame 4. In the present embodiment, the right motor fixing portion 87 is welded to the vertical frame 37, and the left motor fixing portion 87 is detachably fixed to the vertical frame 37 with a bolt. In FIG. 3, the left motor fixing portion 87 is not shown.

Therefore, when mounting the motor unit 16 at the time of the assembling of the vehicle 1, the motor fixing portion 87 and the motor unit 16 can be prevented from interfering with each other. Specifically, the motor unit 16 is temporarily attached to the right motor fixing portion 87, and in this state, the left motor fixing portion 87 is attached to the vertical frame 37 and then fixed to the motor unit 16. Therefore, the motor unit 16 can be stably fixed while improving the ease of attachment and detachment of the motor unit 16.

The pair of motor fixing portions 88 located away from each other in the left-right direction are joined to the lower cross frame 39. Each of the motor fixing portions 88 is, for example, a plate-shaped bracket including a bolt hole directed in the left-right direction. The motor fixing portions 88 project forward from the lower cross frame 39. A pair of lower rear suspension brackets 90 are joined to the lower cross frame 39. The pair of lower rear suspension brackets 90 project rearward from the lower cross frame 39. An upper rear suspension bracket 89 is welded to the cross frame 40 and the pair of vertical frames 37.

Figure 4:
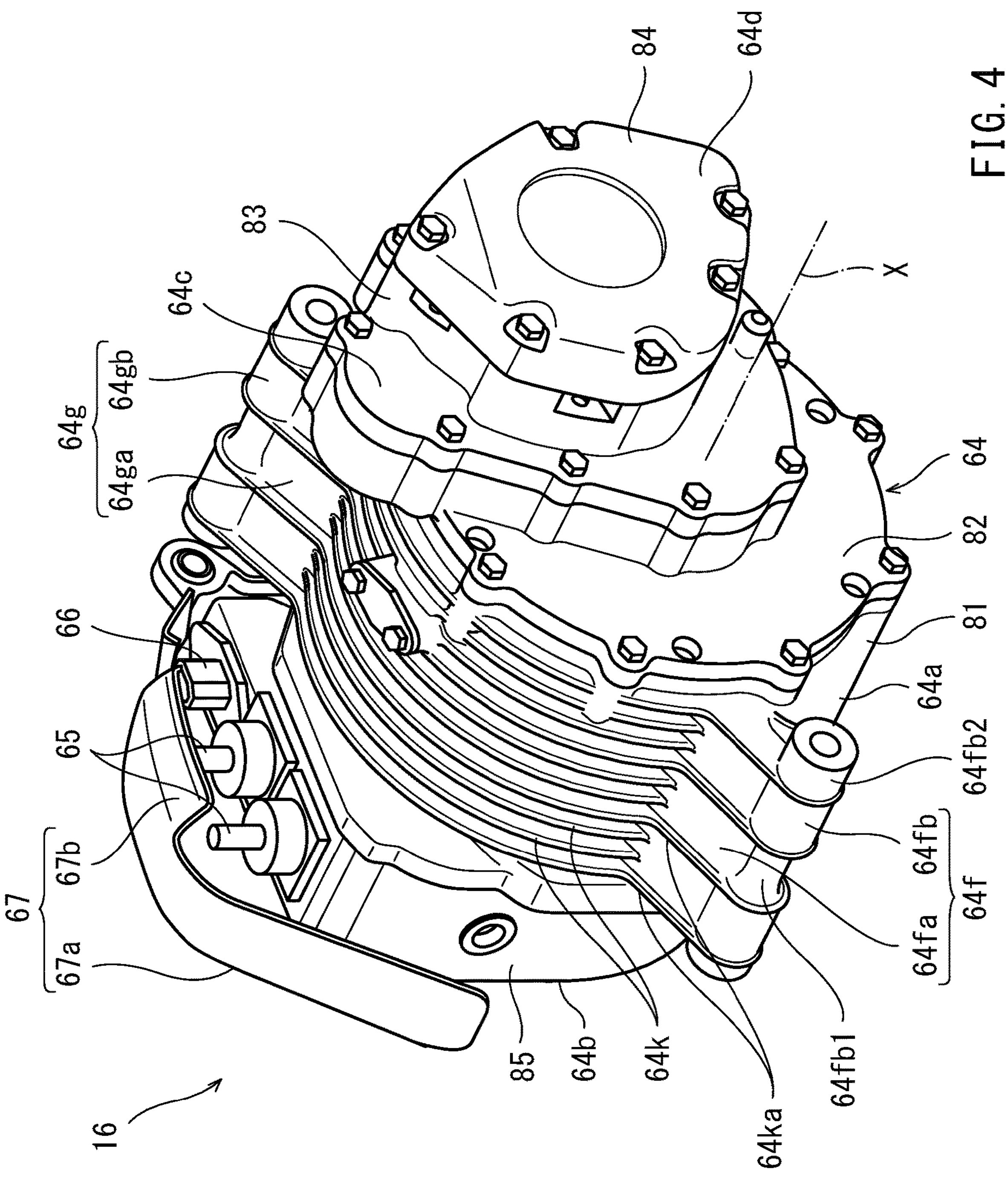
FIG. 4 is a perspective view of a motor unit of FIG. 1 when viewed from the front-left side.
Figure 5:
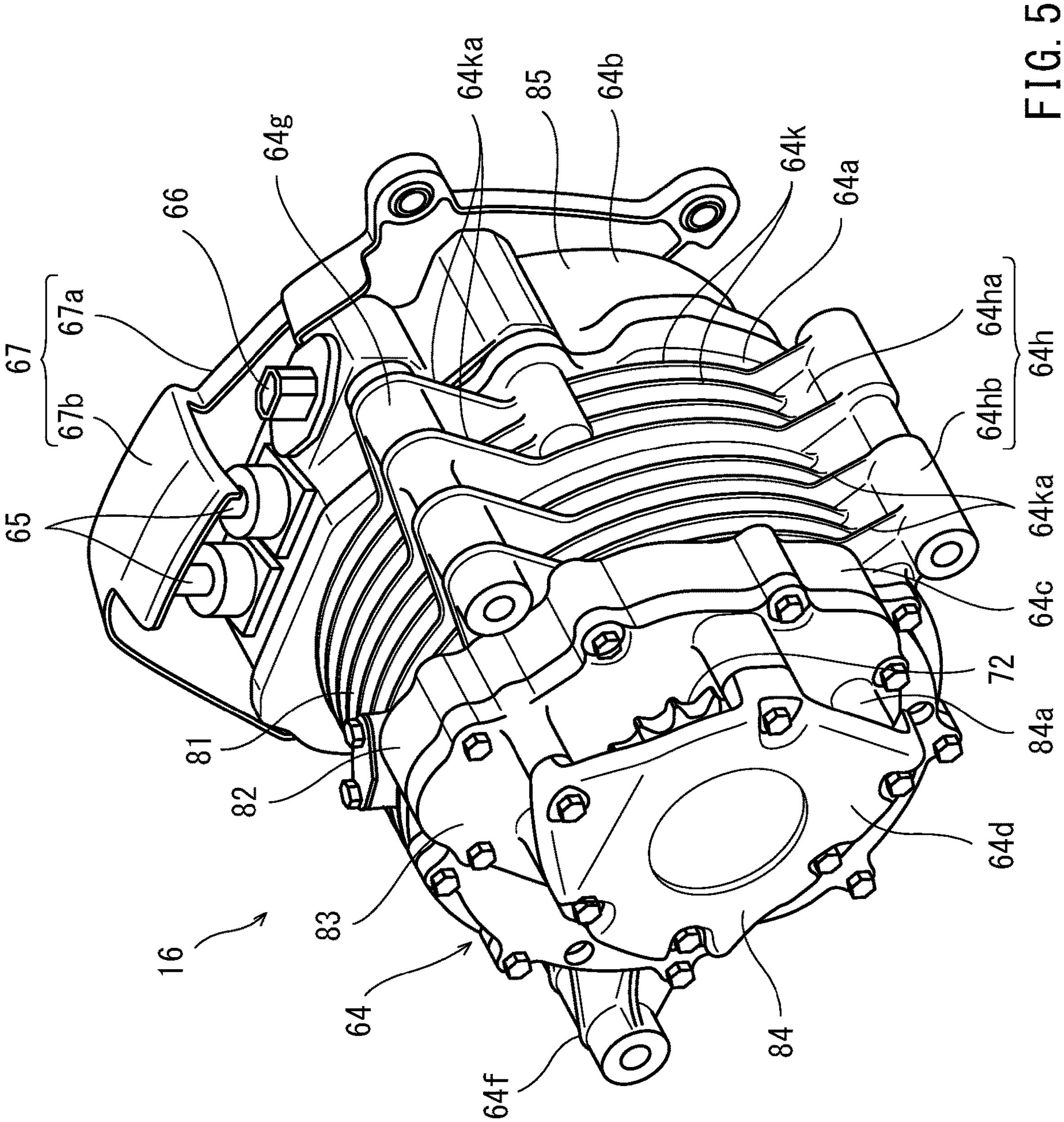
FIG. 5 is a perspective view of the motor unit of FIG. 4 when viewed from a rear-left side.
Figure 6:
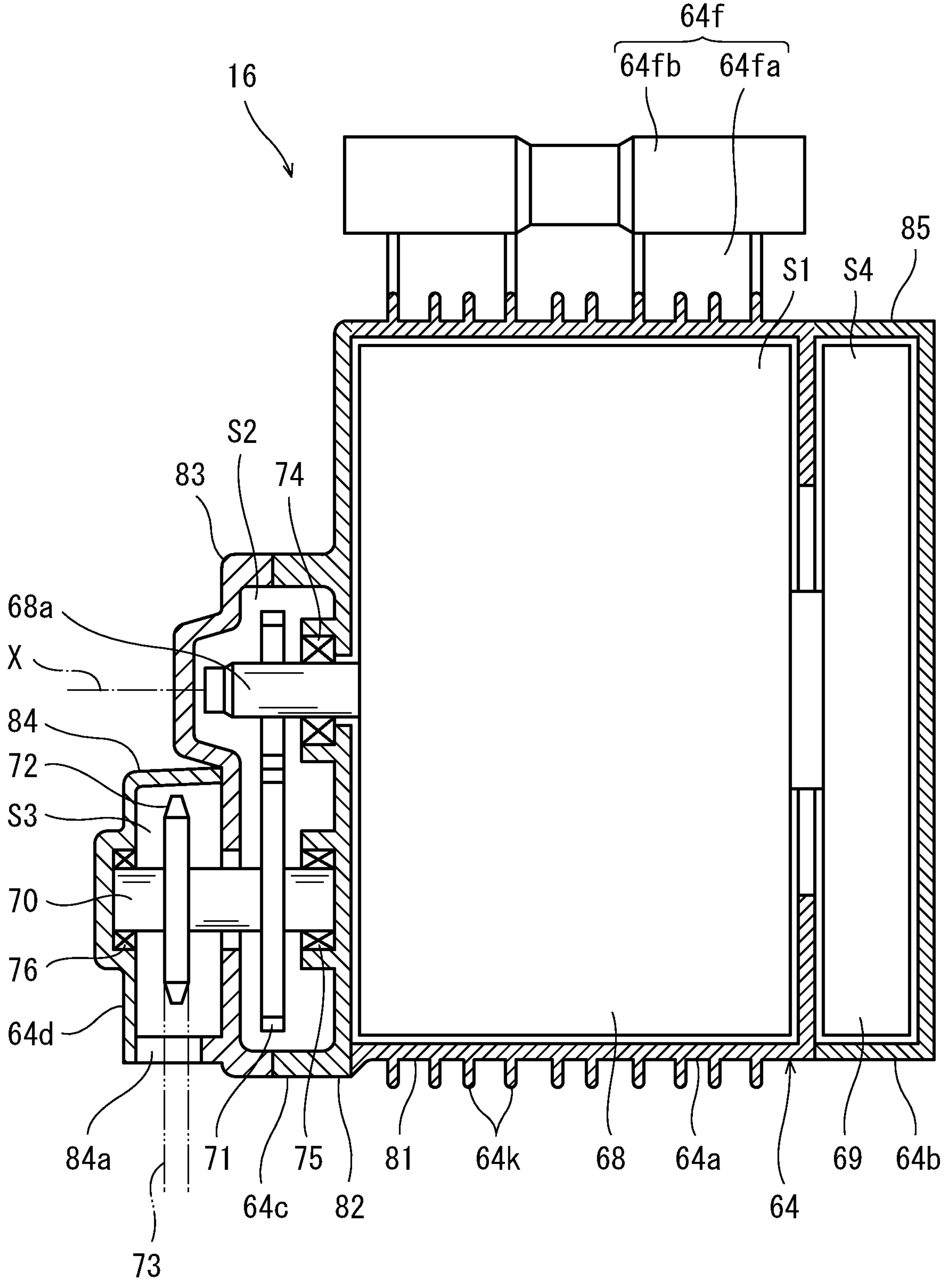
FIG. 6 is a sectional view of the motor unit of FIG. 4.

FIG. 4 is a perspective view of the motor unit 16 of FIG. 1 when viewed from the front-left side. FIG. 5 is a perspective view of the motor unit 16 of FIG. 4 when viewed from a rear-left side. FIG. 6 is a sectional view of the motor unit 16 of FIG. 4. As shown in FIGS. 4 to 6, the motor unit 16 includes the motor case 64. The motor case 64 includes a motor accommodating portion **64*a*, an inverter accommodating portion 64*b*, a speed reducer accommodating portion 64*c*, and a sprocket accommodating portion 64*d*. In a frame mount state that is a state in which the motor unit 16 is mounted on the vehicle body frame 4, the inverter accommodating portion 64*b* is adjacently located at a right side of the motor accommodating portion 64*a*. Hereinafter, the state in which the motor unit 16 is mounted on the vehicle body frame 4 may be referred to as the frame mount state. In the frame mount state, the speed reducer accommodating portion 64*c* is adjacently located at a left side of the motor accommodating portion 64*a*. In the frame mount state, the sprocket accommodating portion 64*d* is adjacently located at a left side of the speed reducer accommodating portion 64*c***.

The electric motor 68 is accommodated in the motor accommodating portion **64*a*. The electric motor 68 includes a motor driving shaft 68*a* that outputs the driving force by which the rear wheel 3 is driven. The motor driving shaft 68*a* extends in the left-right direction. The inverter 69 is accommodated in the inverter accommodating portion 64*b*. The inverter 69 converts the electric power, supplied from the battery 9 (see FIG. 1), into the electric power that can drive the electric motor 68. In the present embodiment, the inverter 69 converts a direct current, supplied from the battery 9, into a three-phase alternating current and supplies the three-phase alternating current to the electric motor 68. The inverter 69 is controlled by the controller 92 (see FIG. 1**).

An output shaft 70 and a speed reducer 71 are accommodated in the speed reducer accommodating portion **64*c*. The output shaft 70 is located outside the electric motor 68 and is located parallel to the motor driving shaft 68*a*. The speed reducer 71 reduces the speed of the driving force of the motor driving shaft 68*a* and transmits the driving force to the output shaft 70. The speed reducer 71 is, for example, a reduction gear pair. In the frame mount state, the speed reducer 71 is located at a left side of the electric motor 68. A sprocket 72 fixed to an end portion of the output shaft 70 is accommodated in the sprocket accommodating portion 64*d***.

The motor accommodating portion **64*a* has a cylindrical shape. To be specific, the motor accommodating portion 64*a*** includes an outer peripheral surface extending in a circumferential direction around the motor driving shaft 68*a*. A cylindrical portion of the motor accommodating portion 64*a* is formed as one undivided piece by forming processing or cutting processing. A front fixing portion 64*f*, an upper-rear fixing portion 64*g*, and a lower-rear fixing portion 64*h* are located at the motor accommodating portion 64*a*. In a side view of the vehicle 1, each of the front fixing portion 64*f*, the upper-rear fixing portion 64*g*, and the lower-rear fixing portion 64*h* projects outward in a radial direction from the outer peripheral surface of the motor accommodating portion 64*a*. In the frame mount state, the front fixing portion 64*f* is located at a front side and a lower side of the motor accommodating portion 64*a*. In the frame mount state, the upper-rear fixing portion 64*g* is located at a rear side and an upper side of the motor accommodating portion 64*a*. In the frame mount state, the lower-rear fixing portion 64*h* is located at a rear side and a lower side of the motor accommodating portion 64*a*.

The front fixing portion 64*f* includes: an arm portion 64*fa* projecting outward in the radial direction from the outer peripheral surface of the motor accommodating portion 64*a*; and a pipe portion 64*fb* located at a tip of the arm portion 64*fa* and serving as a connection portion connected to the motor fixing portion 44 of the vehicle body frame 4. The arm portion 64*fa* extends along the radial direction of the motor accommodating portion 64*a*. The arm portion 64*fa* extends in an axial direction of the motor driving shaft 68*a*, i.e., in the left-right direction of the motor unit 16 in the frame mount state. The pipe portion 64*fb* extends in the axial direction of the motor driving shaft 68*a* along the arm portion 64*fa*, i.e., in the left-right direction of the motor unit 16 in the frame mount state. An internal space of the pipe portion 64*fb* is a bolt insertion hole.

Each of the upper-rear fixing portion 64*g* and the lower-rear fixing portion 64*h* is the same in structure as the front fixing portion 64*f*. To be specific, the upper-rear fixing portion 64*g* includes: an arm portion 64*ga* projecting outward in the radial direction from the outer peripheral surface of the motor accommodating portion 64*a*; and a pipe portion 64*gb* connected to a tip of the arm portion 64*ga*. The lower-rear fixing portion 64*h* includes: an arm portion 64*ha* projecting outward in the radial direction from the outer peripheral surface of the motor accommodating portion 64*a*; and a pipe portion 64*hb* located at a tip of the arm portion 64*ha* and serving as a connection portion connected to the motor fixing portion 88 of the vehicle body frame 4. The arm portion 64*ga* of the upper-rear fixing portion 64*g* and the arm portion 64*ha* of the lower-rear fixing portion 64*h* extend along the radial direction of the motor accommodating portion 64*a* and extend in the axial direction of the motor driving shaft 68*a*, i.e., in the left-right direction of the motor unit 16 in the frame mount state.

The fixing portions 64*f*, 64*g*, and 64*h* are located at a left-right direction inner side of left-right direction outer surfaces of the motor unit 16. In other words, one of left-right direction end surfaces of each of the pipe portions 64*fb*, 64*gb*, and 64*hb* is located at a left-right direction inner side of a corresponding one of left-right direction end surfaces of the motor unit 16. The other left-right direction end surface of each of the pipe portions 64*fb*, 64*gb*, and 64*hb* is located at a left-right direction inner side of the other left-right direction end surface of the motor unit 16. To be specific, the fixing portions 64*f*, 64*g*, and 64*h* of the motor unit 16 are respectively coupled to the motor fixing portions 44, 87, and 88 of the vehicle body frame 4 at positions located at a left-right direction inner side of both left-right direction outer surfaces of the motor unit 16. Therefore, the dimension of the vehicle body frame 4 in the left-right direction can be prevented from increasing. Moreover, the distance between the end portion (motor fixing portion 44) of the left frame 31 of the front frame 21 and the end portion (motor fixing portion 44) of the right frame 32 of the front frame 21 in the left-right direction can be prevented from increasing.

In the pipe portion 64*fb* of the motor case 64, the outer diameter of a middle portion 64*fb*1 located at an inner side in the vehicle width direction is smaller than the outer diameter of a side portion 64*fb*2 located at an outer side in the vehicle width direction. To be specific, the outer shape of the pipe portion 64*fb* has a stepped shape. In other words, the middle portion 64*fb*1 of the pipe portion 64*fb* retreats backward from the adjacent battery case 8, and a gap G (see FIG. 7) is located between the middle portion 64*fb*1 of the pipe portion 64*fb* and the battery case 8. Therefore, power supply cables 93 easily pass through between the battery case 8 and the pipe portion 64*fb*.

Ribs 64*k* are located on the outer peripheral surface of the motor accommodating portion 64*a* and project outward in the radial direction from the outer peripheral surface. The ribs 64*k* extend in the circumferential direction of the outer peripheral surface of the motor accommodating portion 64*a*. To be specific, the ribs 64*k* extend around an axis of the motor driving shaft 68*a*. The ribs 64*k* are lined up at intervals in the axial direction of the motor driving shaft 68*a*, i.e., in the left-right direction of the motor case 64 in the frame mount state. A projecting amount of each rib 64*k* in the radial direction of the motor case 64 is smaller than each of projecting amounts of the front fixing portion 64*f*, the upper-rear fixing portion 64*g*, and the lower-rear fixing portion 64*h* in the radial direction of the motor case 64.

The ribs 64*k* includes: the ribs 64*k* extending from the front fixing portion 64*f* to the upper-rear fixing portion 64*g*; the ribs 64*k* extending from the front fixing portion 64*f* to the lower-rear fixing portion 64*h*; and the ribs 64*k* (see FIG. 7) extending from the upper-rear fixing portion 64*g* to the lower-rear fixing portion 64*h*. To be specific, each rib 64*k* couples two adjacent portions among the fixing portions 64*f*, 64*g*, and 64*h*. In other words, a rib structure including the ribs 64*k* is located on and surrounds the outer peripheral surface of the motor accommodating portion 64*a*.

Specific ribs 64*ka* among the ribs 64*k* serve as reinforcing members that couple the arm portions 64*fa*, 64*ga*, and 64*ha* to the outer peripheral surface of the motor accommodating portion 64*a*. In the vicinity of the arm portions 64*fa*, 64*ga*, and 64*ha*, the dimension of each specific rib 64*ka* in the radial direction is larger than the dimension of each of remaining ribs 64*kb* other than the specific ribs 64*ka*. It is preferable that the ribs 64*ka* that serve as the reinforcing members coupling the arm portions 64*fa*, 64*ga*, and 64*ha* and the outer peripheral surface of the motor accommodating portion 64*a* be located at positions in the circumferential direction of the motor case 64.

The front fixing portion 64*f*, the upper-rear fixing portion 64*g*, and the lower-rear fixing portion 64*h* transmit a load to each other through the ribs 64*k* together with the outer peripheral surface of the motor accommodating portion 64*a*. Therefore, the motor case 64 satisfactorily serves as part of the vehicle body frame 4 while suppressing an increase in thickness of the motor case 64. Moreover, when traveling wind from the front side is guided to the motor case 64, the traveling wind is smoothly guided to the rear side by the ribs 64*k*, and this improves the heat radiation property. Furthermore, in the vehicle 1 including the motor case 64 that is exposed, since the traveling wind flows along the ribs 64*k*, an increase in traveling resistance due to the ribs 64*k* can be prevented.

A pair of terminals 65 and a communication connector 66 are located on an upper surface of the inverter accommodating portion 64*b*. The pair of terminals 65 are a positive electrode terminal and a negative electrode terminal for power supply. Terminals of a pair of power supply cables 93 (see FIG. 1) are respectively connected to the pair of terminals 65. The pair of power supply cables 93 is a positive power supply cable and a negative power supply cable. A connector of a communication cable 95 (see FIG. 1) connected to the controller 92 is connected to the communication connector 66.

A motor case cover 67 is attached to the motor case 64. The motor case cover 67 may be attached to the vehicle body frame 4. The motor case cover 67 includes a side cover portion 67*a* and a terminal cover portion 67*b*. The motor case cover 67 is one piece. The side cover portion 67*a* covers a right side surface of the motor case 64. The terminal cover portion 67*b* covers the pair of terminals 65. When viewed from above, the side cover portion 67*a* covers the pair of terminals 65 and exposes the communication connector 66. The motor case cover 67 realizes both of the protection of the terminals 65 and the improvement of the appearance of the vehicle 1.

The motor case 64 is an assembly including a case main body 81, a motor cover 82, a speed reducer cover 83, a sprocket cover 84, and an inverter cover 85. The case main body 81 constitutes the motor accommodating portion 64*a* and has a substantially cylindrical shape. The front fixing portion 64*f*, the upper-rear fixing portion 64*g*, the lower-rear fixing portion 64*h*, and the ribs 64*k* are located on an outer peripheral surface of the case main body 81.

The motor cover 82 is fixed to the case main body 81 with bolts so as to close a left opening of the case main body 81. The case main body 81 and the motor cover 82 define a motor arrangement space S1 of the motor accommodating portion 64*a*. The electric motor 68 is located in the motor arrangement space S1. The motor driving shaft 68*a* of the electric motor 68 penetrates the motor cover 82 and projects to the left side. The motor cover 82 supports a bearing 74 supporting the motor driving shaft 68*a*. The motor cover 82 also supports a bearing 75 supporting the output shaft 70.

In the side view of the vehicle 1, the speed reducer cover 83 is fixed to the motor cover 82 with bolts so as to cover the motor cover 82 from the left side. In the side view of the vehicle 1, the speed reducer cover 83 is smaller than the motor cover 82. The motor cover 82 and the speed reducer cover 83 define a speed reducer arrangement space S2 of the speed reducer accommodating portion 64*c*. A left end portion of the motor driving shaft 68*a* is located in the speed reducer arrangement space S2. A right portion of the output shaft 70 is located in the speed reducer arrangement space S2. The speed reducer 71 is located in the speed reducer arrangement space S2. The speed reducer 71 is a reduction gear pair that reduces the speed of the rotation of the motor driving shaft 68*a* and transmits the rotation to the output shaft 70.

In the side view of the vehicle 1, the sprocket cover 84 is fixed to the speed reducer cover 83 with bolts so as to cover the speed reducer cover 83 from the left side. In the side view of the vehicle 1, the sprocket cover 84 is smaller than the speed reducer cover 83. In the side view of the vehicle 1, the sprocket cover 84 is located outside the motor driving shaft 68*a* (see also FIG. 8). The speed reducer cover 83 and the sprocket cover 84 define a sprocket arrangement space S3 of the sprocket accommodating portion 64*d*. A left portion of the output shaft 70 is located in the sprocket arrangement space S3. The sprocket cover 84 supports a bearing 76 supporting the output shaft 70.

The sprocket 72 fixed to the output shaft 70 is located in the sprocket arrangement space S3. The chain 73 connected to the rear wheel 3 is wound around the sprocket 72. The sprocket cover 84 includes a chain passing opening 84*a* through which the sprocket arrangement space S3 is open to the rear side. To be specific, the chain 73 passes through the chain passing opening 84*a* and engages with the sprocket 72. The chain 73 is one example of an endless loop, and the sprocket 72 is one example of an engaging rotating body. When a belt is used as the endless loop instead of the chain 73, a pulley may be used as the engaging rotating body instead of the sprocket 72. Moreover, power of the output shaft 70 may be transmitted to the rear wheel 3 by a gear train including a drive shaft instead of the chain 73 or the belt. As above, the output shaft 70 transmits the power to the rear wheel 3 through a power transmitting structure.

In the side view of the vehicle 1, the inverter cover 85 is fixed to the case main body 81 with bolts so as to cover the case main body 81 from the right side. The inverter cover 85 defines an inverter arrangement space S4 of the inverter accommodating portion 64*b*. The inverter 69 is located in the inverter arrangement space S4.

FIG. 7 is a bottom view of major components of the vehicle 1 of FIG. 1. As shown in FIG. 7, the motor fixing portion 44 of the left frame 31 of the front frame 21 and the motor fixing portion 44 of the right frame 32 of the front frame 21 are coupled to each other in the left-right direction through the front fixing portion 64*f* of the motor case 64. Each of the motor fixing portion 44 of the left frame 31 and the motor fixing portion 44 of the right frame 32 has a bottomed cylindrical shape and includes a bottom plate 44*a* that contacts the front fixing portion 64*f* of the motor case 64 and includes a bolt hole.

The motor fixing portion 44 of the left frame 31 and the motor fixing portion 44 of the right frame 32 sandwich the front fixing portion 64*f* of the motor case 64 in the left-right direction. A bolt B1 is inserted into the bolt holes of the bottom plates 44*a* of the motor fixing portions 44 of the left and right frames 31 and 32 and the bolt insertion hole of the pipe portion 64*fb* of the front fixing portion 64*f* of the motor case 64 and is threadedly engaged with a nut N1. Therefore, the motor fixing portion 44 of the left frame 31, the front fixing portion 64*f* of the motor case 64, and the motor fixing portion 44 of the right frame 32 are fastened to each other with the bolt B1. The motor fixing portions 44 of the left and right frames 31 and 32 sandwich the front fixing portion 64*f* of the motor case 64 in the left-right direction. Therefore, even when external force acts in the left-right direction, the left and right frames 31 and 32 are hardly deformed, i.e., hardly approach each other. To be specific, the front fixing portion 64*f* of the motor case 64 serves as a cross frame.

The pair of motor fixing portions 88 of the pivot frame 23 sandwich the lower-rear fixing portion 64*h* of the motor case 64 in the left-right direction. A bolt B2 is inserted into the bolt holes of the pair of motor fixing portions 88 and the bolt insertion hole of the pipe portion 64*hb* of the lower-rear fixing portion 64*h* and is threadedly engaged with a nut N2. Therefore, the lower-rear fixing portion 64*h* of the motor case 64 is fastened to the pair of motor fixing portions 88 of the pivot frame 23 with the bolt B2. The pipe portion 64*hb* of the lower-rear fixing portion 64*h* of the motor case 64 serves as a cross frame that couples the pair of motor fixing portions 88 in the left-right direction.

Figure 8:
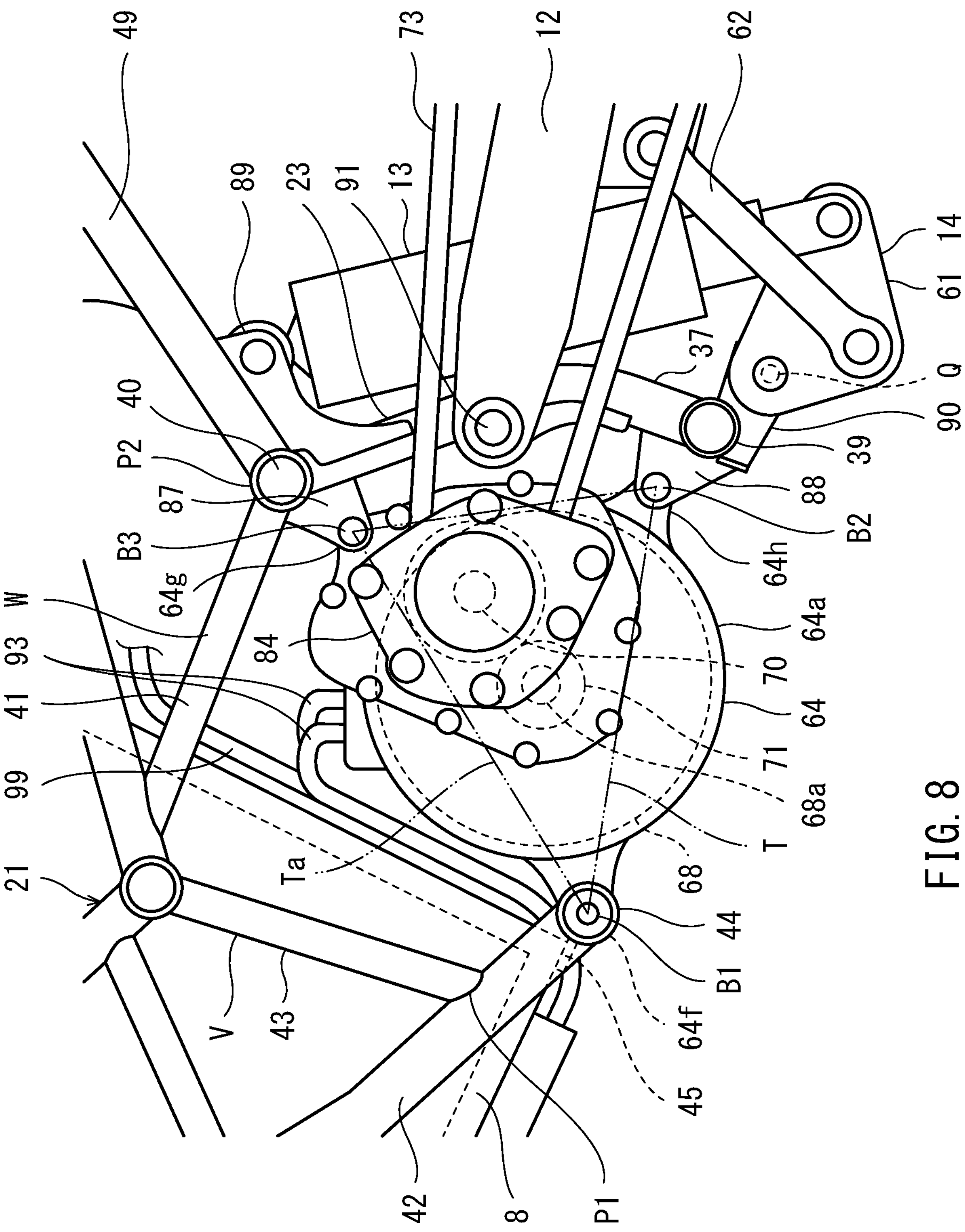
FIG. 8 is an enlarged view of a motor case of FIG. 1 and its vicinity.

Similarly, as shown in FIGS. 4 and 8, the upper-rear fixing portion 64*g* of the motor case 64 is also sandwiched between the pair of motor fixing portions 87 in the left-right direction, and in this state, is fastened to the pair of motor fixing portions 87 with a bolt B2. To be specific, the pipe portion 64*gb* of the upper-rear fixing portion 64*g* of the motor case 64 serves as a cross frame that couples the pair of motor fixing portions 87 in the left-right direction.

As shown in FIG. 7, the swing arm 12 includes a pair of front end supporting portions 12*a* that are spaced apart from each other in the left-right direction. The front end supporting portions 12*a* of the swing arm 12 sandwich the pivot support pipe 38 (see FIG. 3) of the pivot frame 23 in the left-right direction, and in this state, the pivot shaft 91 (see FIG. 1) is inserted into the front end supporting portions 12*a* and the pivot support pipe 38 in the left-right direction. To be specific, the front end supporting portions 12*a* of the swing arm 12 are turnably connected to the pivot support pipe 38 of the pivot frame 23 through the pivot shaft 91.

The pair of vertical frames 37 (see FIG. 3) of the pivot frame 23 are located at a left-right direction inner side of the pair of front end supporting portions 12*a* of the swing arm 12. To be specific, an interval between the pair of vertical frames 37 of the pivot frame 23 in the left-right direction is smaller than an interval between the pair of front end supporting portions 12*a* of the swing arm 12 in the left-right direction. An interval between the pair of motor fixing portions 88 in the left-right direction is larger than an interval between the pair of lower rear suspension brackets 90 in the left-right direction.

The motor fixing portions 44 of the vehicle body frame 4 extend outward in the left-right direction from respective fastening surfaces of the front fixing portion 64*f* of the motor unit 16. The motor fixing portions 44 extend to respective left-right direction outer ends of the motor unit 16. Specifically, the right motor fixing portion 44 projects outward in the left-right direction beyond the inverter accommodating portion 64*b*, and the left motor fixing portion 44 projects outward in the left-right direction beyond the speed reducer accommodating portion 64*c*. Therefore, the motor fixing portion 44 tends to contact obstacles more than the motor unit 16, and the motor unit 16 can be prevented from being damaged.

FIG. 8 is an enlarged view of the motor case 64 of FIG. 1 and its vicinity. As shown in FIG. 8, the lower end portion of the rear suspension 13 is coupled to the swing arm 12 and the pivot frame 23 through the suspension link 14. The suspension link 14 includes a first link plate 61 and a second link plate 62. The first link plate 61 is turnably coupled to the lower end portion of the rear suspension 13, the lower rear suspension brackets 90 of the pivot frame 23, and one end portion of the second link plate 62. The other end portion of the second link plate 62 is turnably coupled to the swing arm 12.

In the side view of the vehicle 1, the motor driving shaft 68*a* and the output shaft 70 are located in a region surrounded by a virtual triangle T defined by connecting the front fixing portion 64*f*, the upper-rear fixing portion 64*g*, and the lower-rear fixing portion 64*h*. Needless to say, the axis of the motor driving shaft 68*a* and the axis of the output shaft 70 are located in the region surrounded by the virtual triangle T. In the side view of the vehicle 1, the front fixing portion 64*f*, the upper-rear fixing portion 64*g*, and the lower-rear fixing portion 64*h* of the motor case 64 are respectively positioned at apexes of the virtual triangle T surrounding the motor driving shaft 68*a* and the output shaft 70.

Specifically, a fastening center of the front fixing portion 64*f*, a fastening center of the upper-rear fixing portion 64*g*, and a fastening center of the lower-rear fixing portion 64*h* are respectively located at the apexes of the virtual triangle T. To be specific, center axes of the bolts B1 to B3 respectively located at the front fixing portion 64*f*, the upper-rear fixing portion 64*g*, and the lower-rear fixing portion 64*h* are respectively located at the apexes of the virtual triangle T. The motor case 64 serves as part of the vehicle body frame 4, and like a truss structure, the motor case 64 improves the rigidity of the vehicle body frame 4 at a position around the motor driving shaft 68*a*. To be specific, the motor case 64 serves as a rigid member. In addition, since a compressive load or a tensile load acts dominantly, a bending load can be prevented from acting. Therefore, the motor case 64 is effectively utilized as the vehicle body frame 4, and the weight of the vehicle 1 can be reduced. Moreover, in a region that overlaps the motor unit 16 in the side view of the vehicle 1, frames can be omitted or reduced.

The vehicle 1 is not a hybrid vehicle but a battery electric vehicle (BEV) that does not include an internal combustion engine. Therefore, the battery 9 is large. However, since the vehicle body frame 4 described as above is adopted, the heavy battery 9 is appropriately supported by the vehicle body frame 4, and the weight increase of the frame is suppressed. Thus, the weight of the vehicle 1 is reduced.

A frame structure including a portion between the front fixing portion 64*f* and the upper-rear fixing portion 64*g* in the motor case 64, a frame V of the vehicle body frame 4, and a frame W of the vehicle body frame 4 has a substantially triangular frame shape in the side view of the vehicle 1. Therefore, the motor case 64 serves as the truss structure together with the adjacent frames V and W, and this can improve the rigidity of the vehicle body frame 4. In the present embodiment, the frame V is one of the bridge frames 43, and the frame W is part of the upper longitudinal frame 41. However, the present embodiment is not limited to this.

In the frame mount state, the motor driving shaft 68*a* is located in front of and under the output shaft 70. In the side view of the vehicle 1, a portion of the speed reducer 71 which is 70% or more and 100% or less of the speed reducer 71 is located inside the virtual triangle T. In the side view of the vehicle 1, the speed reducer 71 overlaps the electric motor 68. In the frame mount state, the front fixing portion 64*f* of the motor case 64 is located lower than the upper-rear fixing portion 64*g* and higher than the lower-rear fixing portion 64*h*. The motor driving shaft 68*a* and the output shaft 70 are lined up in a direction that is inclined relative to the front-rear direction and the upper-lower direction. In the side view of the vehicle 1, the output shaft 70 is located inside an outer edge of the electric motor 68. The sprocket cover 84 is located inside an outer edge of the motor accommodating portion 64*a*. The pivot shaft 91 is located between the upper-rear fixing portion 64*g* and the lower-rear fixing portion 64*h* in the upper-lower direction.

The pivot shaft 91 is located lower than the output shaft 70. The pivot shaft 91 is located higher than the motor driving shaft 68*a*. In the side view of the vehicle 1, a straight line coupling the center axis of the motor driving shaft 68*a* and the center axis of the output shaft 70 is inclined relative to the horizontal direction at an angle of 20° or more and 70° or less, preferably or more and 50° or less. For example, in the side view of the vehicle 1, a portion of the speed reducer 71 which is 80% or more and 100% or less of the speed reducer 71 overlaps the electric motor 68. In the side view of the vehicle 1, a portion of the sprocket 72 which is 90% or more and 100% or less of the sprocket 72 overlaps the electric motor 68. In the side view of the vehicle 1, part of the speed reducer 71 and part of the sprocket 72 may be located higher than the electric motor 68. As described above, the arrangement of the shafts is devised, and in the side view of the vehicle 1, the electric motor 68 is located at a lower side, and the speed reducer 71 and the sprocket 72 are allowed to project upward. Thus, the entire motor unit 16 can be located close to the pivot shaft 91.

In the frame mount state, the front fixing portion 64*f* and the lower-rear fixing portion 64*h* are located higher than a lower end of the motor accommodating portion 64*a*. The upper-rear fixing portion 64*g* may be located lower than an upper end of the motor accommodating portion 64*a* or may be located higher than the upper end of the motor accommodating portion 64*a*. The motor driving shaft 68*a*, the output shaft 70, and the pivot shaft 91 are located lower than the upper-rear fixing portion 64*g* and higher than the lower-rear fixing portion 64*h*. To be specific, the motor driving shaft 68*a*, the output shaft 70, and the pivot shaft 91 are located in a height range between the height of the upper-rear fixing portion 64*g* and the height of the lower-rear fixing portion 64*h*.

In the side view of the vehicle 1, one side Ta of the virtual triangle T, i.e., a virtual straight line connecting the fastening center of the front fixing portion 64*f* and the fastening center of the upper-rear fixing portion 64*g* extends along an extended line of the support frame 49. The lower-rear fixing portion 64*h* of the motor case 64 is closer to a coupling point Q where the suspension link 14 and the pivot frame 23 are coupled to each other, than the pivot shaft 91. Therefore, stress acting on the pivot frame 23 by a load applied from the suspension link 14 is reduced. The motor case 64 is located in a height range between the height of the upper end of the rear suspension 13 and the height of the lower end of the rear suspension 13.

The upper-rear fixing portion 64*g* of the motor case 64 is adjacently located in front of the upper rear suspension bracket 89. The lower-rear fixing portion 64*h* of the motor case 64 is adjacently located in front of the lower rear suspension brackets 90. In the side view of the vehicle 1, the pivot frame 23 has a shape that curves along a rear surface of the motor case 64. A portion of the pivot frame 23 which is located between the upper-rear fixing portion 64*g* and the lower-rear fixing portion 64*h* curves in a circular-arc shape that is convex rearward. The pivot frame 23 and the motor case 64 are directly opposed to each other in the front-rear direction.

As above, since the pivot frame 23 curves along the motor case 64, the pivot frame 23 and the motor case 64 can be made close to each other as a whole. Therefore, the projecting amounts of the motor fixing portions 87 and 88 of the vehicle body frame 4 which project from the frame main body toward the motor case 64 can be suppressed. Moreover, the projecting amounts of the upper-rear fixing portion 64*g* and the lower-rear fixing portion 64*h* of the motor case 64 which project from the case main body toward the pivot frame 23 can be suppressed.

In the side view of the vehicle 1, the motor fixing portion 44 is adjacent to a joined portion P1 where the lower longitudinal frame 42 and the bridge frame 43 are joined to each other. To be specific, the lower longitudinal frame 42 and the bridge frame 43 respectively serve as a first frame and a second frame which are joined to each other at the joined portion P1 that is adjacent to the front fixing portion 64*f* of the below-described motor case 64 in the side view of the vehicle 1. In the present embodiment, a distance between the joined portion P1 and the front fixing portion 64*f* is shorter than each of a distance between the upper-rear fixing portion 64*g* and the front fixing portion 64*f* and a distance between the lower-rear fixing portion 64*h* and the front fixing portion 64*f*. Therefore, a load from the joined portion P1 at which the first frame and the second frame are joined to each other and which is located at an intersection point of the truss structure can be transmitted to the front fixing portion 64*f* of the motor case 64, and this improves the function of the truss structure.

In the side view of the vehicle 1, the motor fixing portion 87 is adjacent to a joined portion P2 where the upper longitudinal frame 41 and the support frame 49 are joined to each other. To be specific, the upper longitudinal frame 41 and the support frame 49 respectively serve as a third frame and a fourth frame which are joined to each other at the joined portion P2 that is adjacent to the upper-rear fixing portion 64*g* of the below-described motor case 64 in the side view of the vehicle 1. In the present embodiment, a distance between the joined portion P2 and the upper-rear fixing portion 64*g* is shorter than each of a distance between the front fixing portion 64*f* and the upper-rear fixing portion 64*g* and a distance between the lower-rear fixing portion 64*h* and the upper-rear fixing portion 64*g*. Therefore, a load from the joined portion P2 at which the third frame and the fourth frame are joined to each other and which is located at an intersection point of the truss structure can be transmitted to the upper-rear fixing portion 64*g* of the motor case 64, and this improves the function of the truss structure. Both of the configuration in which the joined portion P1 where the first frame and the second frame are joined to each other is located close to the front fixing portion 64*f* and the configuration in which the joined portion P2 where the third frame and the fourth frame are joined to each other is located close to the upper-rear fixing portion 64*g* may not be adopted, and only one of these configurations may be adopted.

Figure 9:
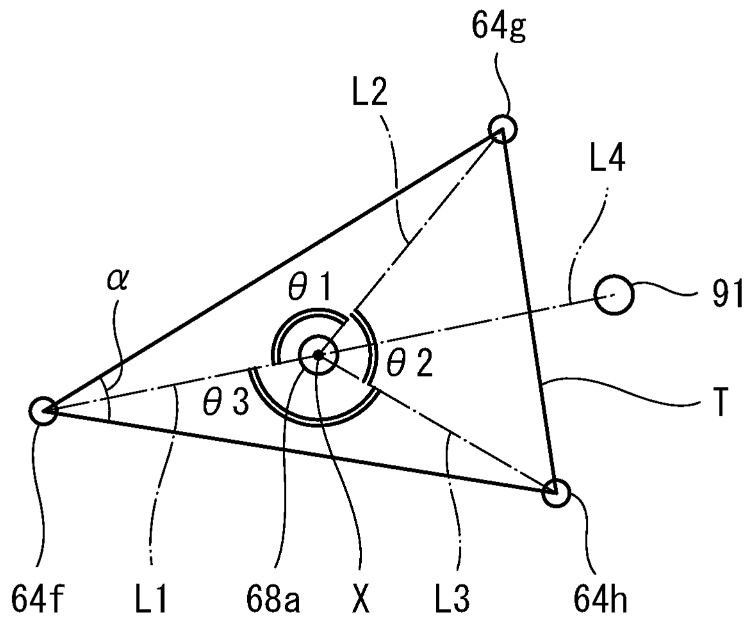
FIG. 9 is an enlarged schematic diagram of a virtual triangle and the like of FIG. 8.

FIG. 9 is an enlarged schematic diagram of the virtual triangle T and the like of FIG. 8. As shown in FIG. 9, in the present embodiment, the virtual triangle T has such a shape that a distance between the upper-rear fixing portion 64*g* and the lower-rear fixing portion 64*h* is shorter than each of a distance between the front fixing portion 64*f* and the upper-rear fixing portion 64*g* and a distance between the front fixing portion 64*f* and the lower-rear fixing portion 64*h*. More specifically, the virtual triangle T is formed in a shape close to an isosceles triangle. In the side view of the vehicle 1, a straight line L1 connecting an axis X of the motor driving shaft 68*a* and the fastening center of the front fixing portion 64*f* extends so as to divide a front angle $\alpha$ of the virtual triangle T into two equal angles. Moreover, in the side view of the vehicle 1, the motor driving shaft 68*a* is located so as to partially overlap a straight line L4 connecting the fastening center of the front fixing portion 64*f* and the center axis of the pivot shaft 91.

In the side view of the vehicle 1, each of angles $\theta$1, $\theta$2, and $\theta$3 each formed by two adjacent straight lines among straight lines connecting the axis X of the motor driving shaft 68*a* and the fastening centers of the fixing portions 64*f*, 64*g*, and 64*h* is an angle within a range of more than 60° and less than 180°. For example, the angle $\theta$1 between the straight line L1 connecting the axis X and the fastening center of the front fixing portion 64*f* and a straight line L2 connecting the axis X and the fastening center of the upper-rear fixing portion 64*g* is substantially equal to the angle $\theta$3 between a straight line L3 connecting the axis X and the fastening center of the lower-rear fixing portion 64*h* and the straight line L1 connecting the axis X and the fastening center of the front fixing portion 64*f*. The expression "substantially equal" denotes that a difference between these angles is less than 20°. As above, since the angles θ1 and θ3 are set to be substantially equal to each other, the upper-rear fixing portion 64*g* and the lower-rear fixing portion 64*h* can appropriately share the load applied rearward from the front fixing portion 64*f*.

As shown in FIG. 2, the battery case 8 is located at a low position in front of the motor case 64. Specifically, a lower end of the battery case 8 is located lower than an upper end of the motor case 64. The battery case 8 is inclined relative to the vertical direction so as to extend diagonally toward the front-lower side. Specifically, in the side view of the vehicle 1, front and rear surfaces of the battery case 8 are inclined relative to the vertical direction so as to extend diagonally toward the front-lower side. In other words, the battery case 8 is fixed to the vehicle body frame 4 such that an axis of the battery case 8 is inclined so as to extend forward as the axis extends downward from its upper end. Moreover, the battery case 8 is fixed to the vehicle body frame 4 such that a bottom surface of the battery case 8 is inclined so as to extend downward as the bottom surface extends rearward from its front end.

The battery case 8 includes a case main body 51 and a lower cover 52. The case main body 51 includes a container portion 55 and a flange portion 56. The container portion 55 defines the battery accommodating space BS accommodating the battery 9. The flange portion 56 projects in a flange shape from an upper end of the container portion 55. The case main body 51 includes an upper opening 51*a* through which the battery accommodating space BS is open toward a rear-upper side and which is defined by the flange portion 56. The upper cover 10 is attached to the battery case 8 so as to close the upper opening 51*a*.

The lower cover 52 is attached to a lower surface of the case main body 51. The lower cover 52 has a recess shape that is open upward. The lower cover 52 defines a cable accommodating space CS together with the lower surface of the case main body 51. The power supply cables 93 and a communication cable 99 which are electrically connected to the battery 9 accommodated in the battery accommodating space BS are located in the cable accommodating space CS. A rear surface of the lower cover 52 includes cable passing openings WH through which the cables 93 and 99 pass. The cables 93 and 99 extend from the lower cover 52 through the cable passing openings WH to an outside. The power supply cables 93 extend from the battery case 8 to the motor case 64, specifically the inverter accommodating portion 64*b*. The communication cable 99 extends from the battery case 8 to the controller 92.

In the present embodiment, the cable passing openings WH are located at a position higher than a lower surface of the lower cover 52 and are located on the rear surface of the lower cover 52. The cable passing openings WH are located higher than the lower end of the battery case 8. The cable passing openings WH are located higher than a lower end of the motor fixing portion 44 of the front frame 21. Therefore, the cables 92 and 99 are prevented from contacting obstacles. The cables 92 and 99 extend from the cable passing openings WH to a rear side of the lower cover 52 and then extend upward along the rear surface of the battery case 8. In the side view of the vehicle 1, the cables 92 and 99 extend from the cable passing openings WH through a gap between the battery case 8 and the motor fixing portion 44 and then extend upward between the battery case 8 and the motor case 64.

A lower end of the motor case 64 is located lower than the cable passing openings WH of the battery case 8. The power supply cables 93 pass through between the battery case 8 and the motor case 64 in the upper-lower direction. The battery case 8 overlaps the power supply cables 93 when viewed from front. For example, the entire power supply cables 93 are hidden by the battery case 8 when viewed from front. The power supply cables 93 are protected by the battery case 8 and the motor case 64.

As shown in FIGS. 7 and 8, the front frame 21 includes the plate-shaped lower-rear supporting portions 45 supporting a rear end portion of the bottom surface of the battery case 8. The dimension of a gap between the left lower-rear supporting portion 45 and the right lower-rear supporting portion 45 in the left-right direction is smaller than the dimension of the battery case 8 in the left-right direction. A distance between a left end of the left lower-rear supporting portion 45 and a right end of the right lower-rear supporting portion 45 in the left-right direction is equal to or larger than the dimension of the battery case 8 in the left-right direction. Therefore, a left-right direction end portion of a lower surface rear portion of the battery case 8 can be suitably mounted on the lower-rear supporting portions 45. To be specific, the rear end portion of the bottom surface of the battery case 8 is mounted on the lower-rear supporting portions 45 of the front frame 21 from above. The lower-rear supporting portions 45 are fixed to the battery case 8 from below with bolts.

Figure 10A:
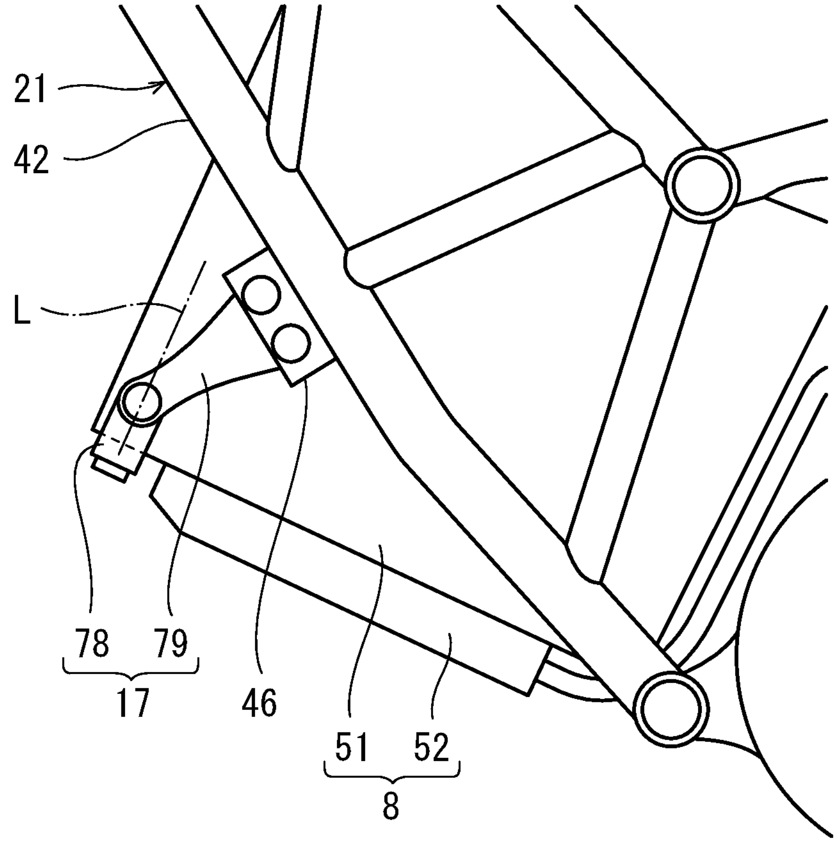
FIG. 10A is an enlarged view of a battery case of FIG. 1 and its vicinity.
Figure 10B:
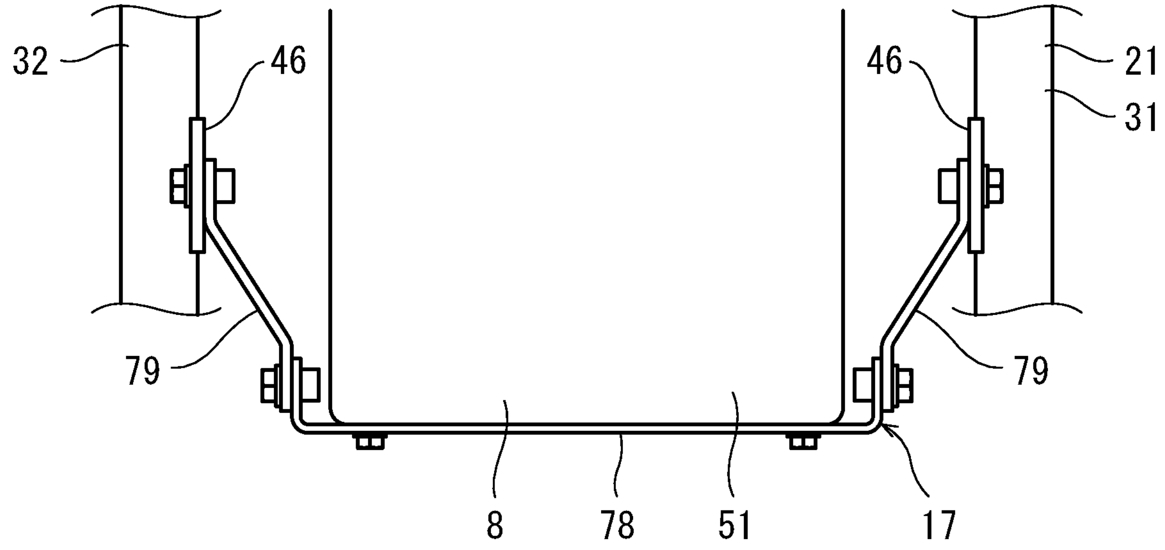
FIG. 10B is a front view of the battery case of FIG. 10A and its vicinity.

FIG. 10A is an enlarged view of the battery case 8 of FIG. 1 and its vicinity. FIG. 10B is a front view of the battery case 8 of FIG. 10A and its vicinity. As shown in FIGS. 10A and 10B, the front frame 21 includes the lower-front support bracket 46. Specifically, the lower-front support bracket 46 projects from the intermediate portion of the lower longitudinal frame 42 to the front-lower side. A support 17 is fixed to the lower-front support bracket 46. The support 17 supports the front end portion of the lower surface of the battery case 8.

The support 17 includes a lower-front supporting portion 78 and a pair of arm portions 79. The lower-front supporting portion 78 is located at a lower side of the front end portion of the lower surface of the battery case 8 and projects toward both sides in the left-right direction beyond both ends of the lower surface of the battery case 8. An upper surface of the lower-front supporting portion 78 is a supporting surface that supports the lower surface of the battery case 8 from below. The pair of arm portions 79 extend from both left-right direction ends of the lower-front supporting portion 78 toward the front frame 21 and are fixed to the lower-front support brackets 46 with bolts. The lower-front supporting portion 78 and the arm portions 79 are separate portions and are fixed to each other with bolts. The support 17 may be one piece.

The lower surface of the battery case 8 is inclined relative to the horizontal direction and extends diagonally to the lower-rear side. To be specific, the lower surface of the battery case 8 is inclined downward as the lower surface extends rearward from its front end. In the side view of the vehicle 1, a front-lower portion of the battery case 8 projects downward from the front frame 21. The support 17 is coupled to the front frame 21. In the side view of the vehicle 1, the arm portion 79 is inclined relative to a perpendicular direction that is a direction in which a perpendicular line L of the upper surface of the lower-front supporting portion 78 extends. To be specific, the arm portion 79 is inclined backward relative to the front surface of the battery case 8 and extends diagonally to the rear-upper side. In other words, the arm portion 79 is inclined downward as the arm portion 79 extends forward from a portion of the arm portion

79 which is connected to the lower longitudinal frame 42. The lower-front supporting portion 78 of the support 17 is fixed to the battery case 8 from below with bolts. Specifically, the lower-front supporting portion 78 of the support 17 is located in front of the lower cover 52 and is fixed to the lower surface of the case main body 51 with bolts.

Figure 11:
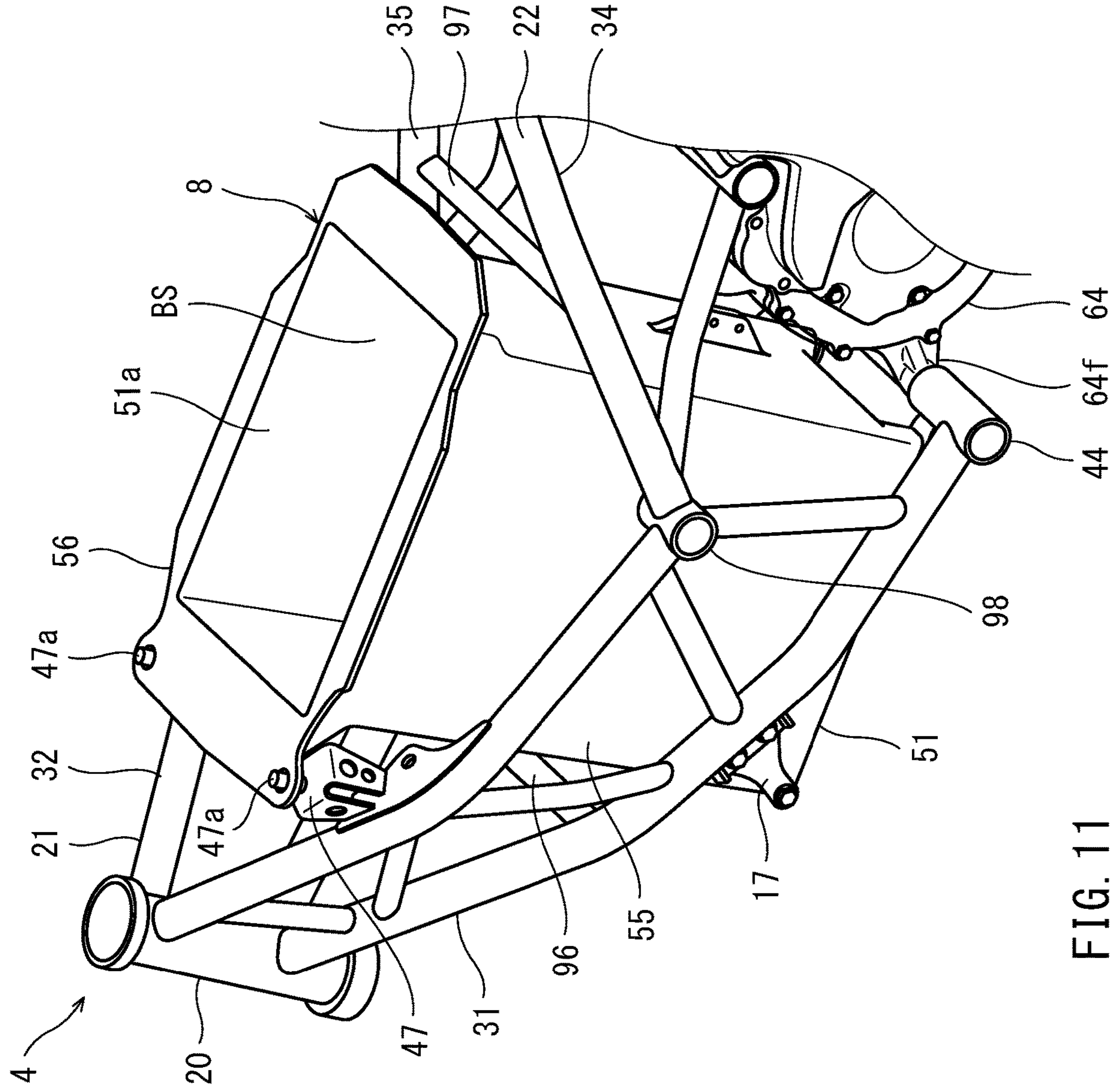
FIG. 11 is a perspective view of the battery case of FIG. 1 and its vicinity when viewed from an upper-left side.

FIG. 11 is a perspective view of the battery case 8 of FIG. 1 and its vicinity when viewed from an upper-left side. As shown in FIG. 11, the battery case 8 includes the upper opening 51*a* through which the battery accommodating space BS is open upward. The front frame 21 includes the front upper supporting portions 47 supporting a front-upper portion of the battery case 8. Each of the upper-front supporting portions 47 includes the projection 47*a* directed upward. The projection 47*a* is inserted, from below, into a hole of the flange portion 56 located around the upper opening 51*a* of the battery case 8. The flange portion 56 is supported by the upper-front supporting portions 47 from below. Therefore, the battery case 8 can be easily assembled to the front frame 21 and is stably supported.

The front frame 21 includes a first cross frame 96 located in front of the battery case 8 and a second cross frame 97 located behind the battery case 8. The first cross frame 96 is located in front of the battery case 8, extends in the left-right direction, and couples the left frame 31 and the right frame 32. The second cross frame 97 is located behind the battery case 8, extends in the left-right direction, and couples the left frame 34 and the right frame 35.

The first cross frame 96 is located higher than the motor fixing portion 44 and lower than the second cross frame 97. To be specific, in the side view of the vehicle 1, three points that are the first cross frame 96, the second cross frame 97, and the front fixing portion 64*f* of the motor case 64 which serves as a cross frame are located so as to surround the battery case 8. Therefore, the deformation of the front frame 21 by which the left frame 31 and the right frame 32 approach each other in the left-right direction is suitably prevented, and the battery case 8 is satisfactorily protected.

In the present embodiment, in the side view of the vehicle 1, the center of gravity of the battery case 8 is located in a triangular region defined by straight lines connecting the center of the first cross frame 96, the center of the second cross frame 97, and the fastening center of the front fixing portion 64*f* of the motor case 64. Specifically, the first cross frame 96 is located at an intermediate position in a range from an upper end of the front surface of the battery case 8 to a lower end of the front surface. The second cross frame 97 is located at an upper position in a range from an upper end of the rear surface of the battery case 8 to a lower end of the rear surface. The front fixing portion 64*f* of the motor case 64 is located at a lower position in the range from the upper end of the rear surface of the battery case 8 to the lower end of the rear surface.

Figure 12:
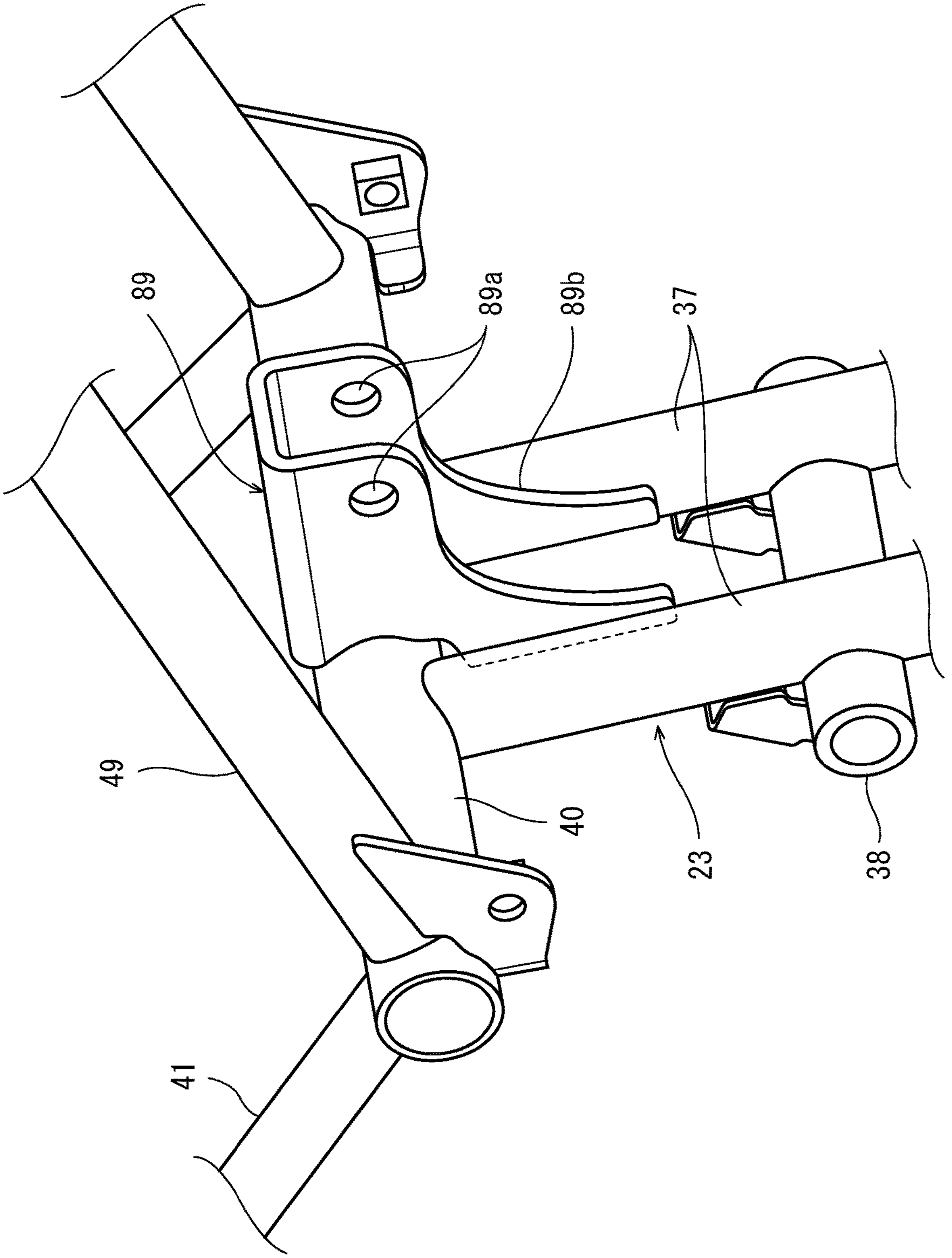
FIG. 12 is a perspective view of a rear suspension bracket of the vehicle body frame of FIG. 3 and its vicinity when viewed from the rear-left side.

FIG. 12 is a perspective view of the upper rear suspension bracket 89 of the vehicle body frame 4 of FIG. 3 and its vicinity when viewed from the rear-left side. As shown in FIG. 12, the upper rear suspension bracket 89 is welded to the pair of vertical frames 37 of the pivot frame 23 and the cross frame 40. The upper rear suspension bracket 89 includes connection holes 89*a* to which the upper end portion of the rear suspension 13 is connected. The upper rear suspension bracket 89 is located behind the vertical frames 37. The upper rear suspension bracket 89 is welded to a rear surface of the cross frame 40.

Figure 13A:
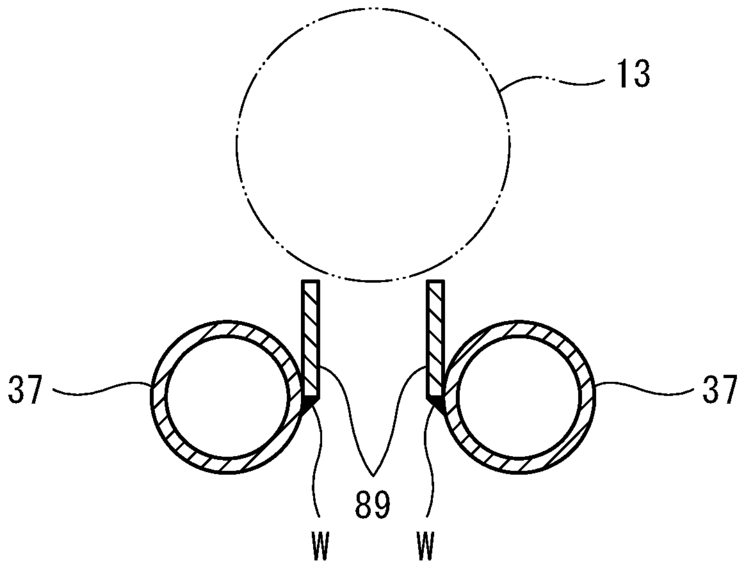
FIG. 13A is a sectional view of an upper rear suspension bracket of FIG. 12 and its vicinity when viewed from above.

FIG. 13A is a sectional view of the upper rear suspension bracket 89 of FIG. 12 and its vicinity when viewed from above. As shown in FIG. 13A, the upper rear suspension bracket 89 is welded to opposing left-right direction inner surfaces of the pair of vertical frames 37 at weld portions W. Therefore, as compared to when the upper rear suspension bracket 89 is welded to the rear surfaces of the vertical frames 37, influence of bending stress of the vertical frames 37 on welded portions of the upper rear suspension bracket 89 is reduced.

Figure 13B:
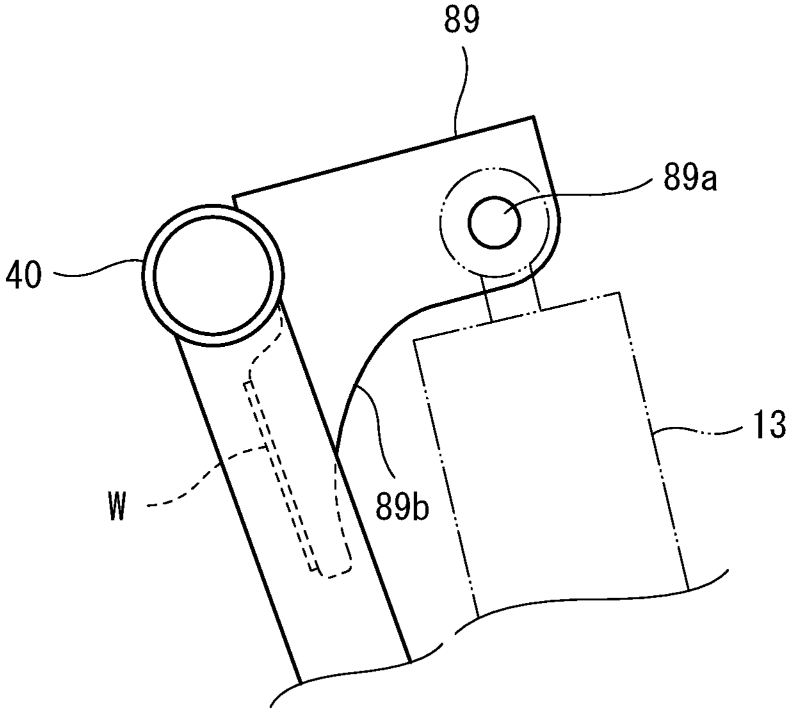
FIG. 13B is a left side view of the upper rear suspension bracket of FIG. 12 and its vicinity.

FIG. 13B is a left side view of the upper rear suspension bracket 89 of FIG. 12 and its vicinity. As shown in FIG. 13B, in the side view of the vehicle 1, the upper rear suspension bracket 89 includes arch-shaped end edges 89*b* opposed to the rear suspension 13. Each of the end edges 89*b* of the upper rear suspension bracket 89 is concave toward an upper-front side. In the side view of the vehicle 1, the rear suspension 13 overlaps the upper rear suspension bracket 89 in the upper-lower direction and overlaps the upper rear suspension bracket 89 in the front-rear direction.

Figure 14:
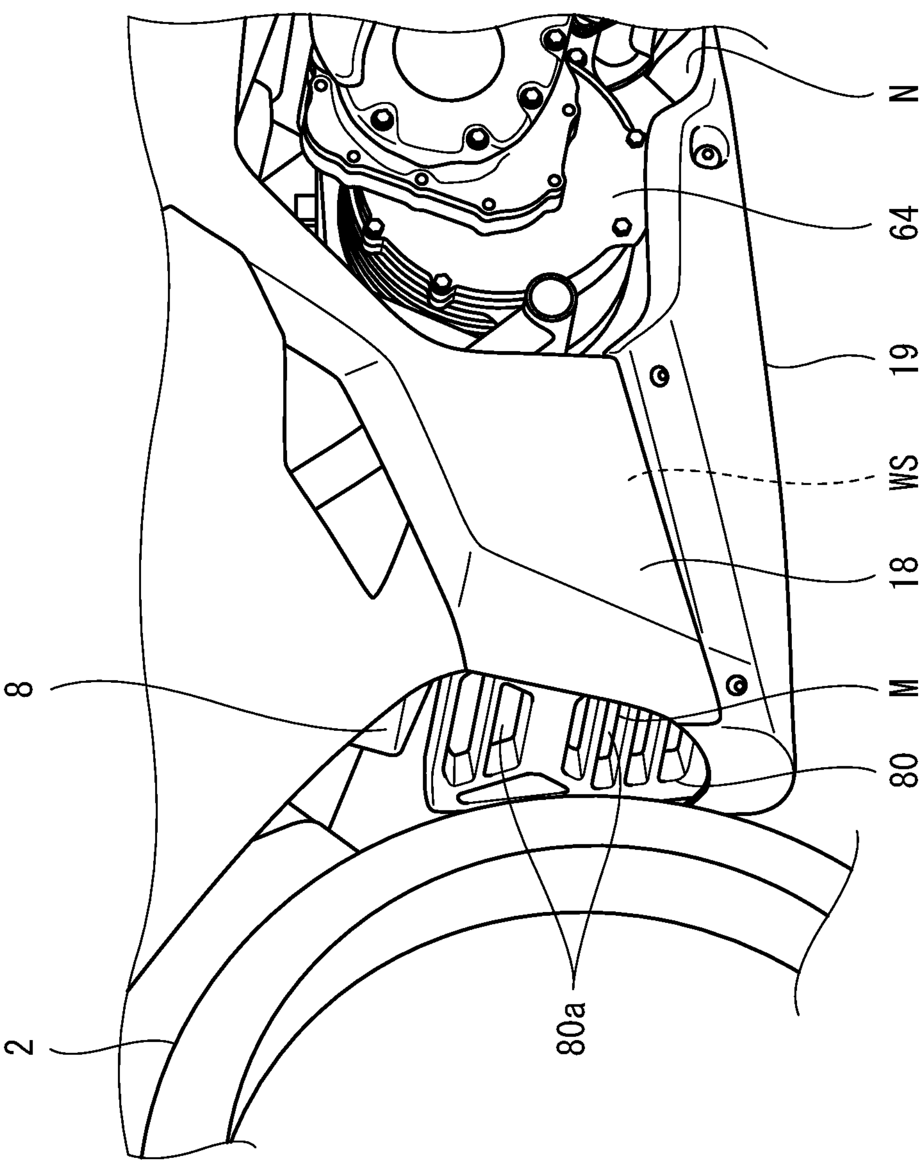
FIG. 14 is a perspective view of a wind guide structure of the vehicle of FIG. 1 when viewed from the front-left side.
Figure 15:
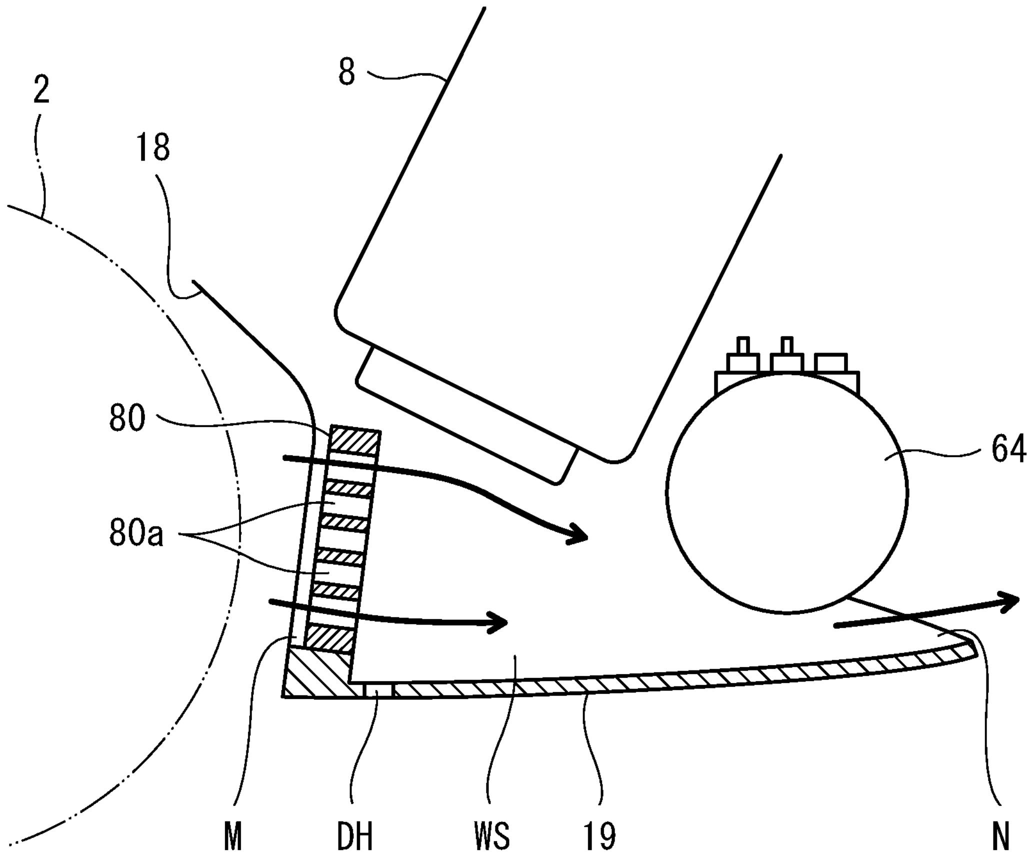
FIG. 15 is a sectional view of the wind guide structure of FIG. 14.

FIG. 14 is a perspective view of a wind guide structure of the vehicle 1 of FIG. 1 when viewed from the front-left side. FIG. 15 is a sectional view of the wind guide structure of FIG. 14. As shown in FIGS. 14 and 15, the vehicle 1 includes a pair of side cowls 18 and a lower cowl 19. The pair of side cowls 18 cover a space under the battery case 8 from both sides in the left-right direction. The lower cowl 19 is connected to lower end portions of the pair of side cowls 18 so as to cover, from below, the space defined between the pair of side cowls 18. To be specific, the side cowls 18 and the lower cowl 19 cover, from the left, right, and lower sides, a wind guide space WS located in front of the motor case 64 and under the battery case 8.

The side cowls 18 and the lower cowl 19 include a front opening M through which the wind guide space WS is open forward. A wind guide cover 80 including wind guide holes 80*a* that are open in the front-rear direction is located at the front opening M. To be specific, the wind guide cover 80 covers the wind guide space WS from front. The wind guide space WS is defined between the lower surface of the battery case 8 and an upper surface of the lower cowl 19. The lower surface of the battery case 8 extends diagonally toward the lower-rear side. The dimension of the wind guide space WS in the upper-lower direction substantially decreases as the wind guide space WS extends rearward.

The traveling wind flowing into the wind guide space WS through the wind guide holes 80*a* of the wind guide cover 80 accelerates rearward in the wind guide space WS and contacts the motor case 64 to cool the motor case 64. In the side view of the vehicle 1, an outer surface of the motor case 64 has a substantially circular shape. Therefore, the traveling wind from the wind guide space WS smoothly flows rearward along the outer peripheral surface of the motor case 64. The side cowls 18 and the lower cowl 19 include a rear opening N through which the wind guide space WS is open rearward. The traveling wind that has cooled the motor case 64 is discharged rearward through the rear opening N.

Since the lower surface of the battery case 8 is inclined toward the rear-lower side, a passage extending from the front side toward the motor case 64 narrows. Therefore, the traveling wind is guided to the motor case 64 while accelerating. Similarly, since the outer surface of the motor case 64 has a cylindrical shape, a passage located between the motor case 64 and the lower cowl 19 and extending rearward narrows. Therefore, the traveling wind flows along the motor case 64 while accelerating. By increasing the flow velocity of the traveling wind that collides with the motor case 64 as above, the cooling effect of the motor case 64 can be increased.

The traveling wind can flow through the wind guide holes 80*a* of the wind guide cover 80, but the wind guide cover 80 prevents relatively large foreign matters from getting into the wind guide space WS. For example, the foreign matters are prevented from colliding with the cables 92 and 99 and the terminal 65 of the motor unit 16. A lower portion of the lower cowl 19 includes a drain hole DH. Water may enter into the wind guide space WS through the wind guide holes 80*a* of the wind guide cover 80, but such water having entered into the wind guide space WS is discharged to an outside of the vehicle 1 through the drain hole DH of the lower cowl 19. The wind guide cover 80 may be omitted.

As described above, the embodiment has been described as an example of the technology disclosed in the present application. However, the technology in the present disclosure is not limited to this and is also applicable to embodiments in which modifications, replacements, additions, omissions, and the like are suitably made. Moreover, a new embodiment may be prepared by combining the components described in the above embodiment. For example, some of components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

The structure of the vehicle body frame 4 is one example, and another frame structure may be adopted. For example, the vehicle body frame 4 may have another frame structure, such as a double cradle type, a backbone frame, or a monocoque frame. The vehicle 1 may be of a naked type without cowls or may be of a type with cowls.

In the above-described embodiment, a reduction ratio of the speed reducer 71 is fixed. However, the speed reducer 71 may be a transmission that can change the reduction ratio. In the above embodiment, the fixing portions 64*f*, 64*g*, and 64*h* are located at the motor accommodating portion 64*a* that does not accommodate the speed reducer 71 but accommodates the electric motor 68. Therefore, the load transmitted to the vehicle body frame 4 is prevented from being transmitted to the speed reducer accommodating portion 64*c* and the sprocket accommodating portion 64*d*, and this can suppress the rigidity requirements of the speed reducer accommodating portion 64*c* and the sprocket accommodating portion 64*d*.

In the present embodiment, three groups that are a group of the ribs 64*k* extending between the front fixing portion 64*f* and the upper-rear fixing portion 64*g*, a group of the ribs 64*k* extending between the front fixing portion 64*f* and the lower-rear fixing portion 64*h*, and a group of the ribs 64*k* extending between the upper-rear fixing portion 64*g* and the lower-rear fixing portion 64*h* are located at the motor case 64. However, depending on the details of the rigidity requirements, one or more of these three groups may be omitted, or the shapes of the ribs 64*k* may be changed.

It is preferable that the battery case 8 be located between the head pipe 20 and the seat 11. However, the battery case 8 may be located at another position. For example, the battery case 8 may be located above the motor case 64 or may be located behind the motor case 64. The speed reducer 71 may be omitted. To be specific, the sprocket 72 may be directly located at the motor driving shaft 68*a* of the electric motor 68, and the motor driving shaft 68*a* may be used as an output shaft. Moreover, the output shaft 70 may be located outside the region of the virtual triangle T with the motor driving shaft 68*a* located in the region of the virtual triangle T.

It is preferable that the motor unit 16 be located behind the battery case 8. However, the motor unit 16 may be located at another position as long as the lower surface of the battery case 8 can be supported by the vehicle body frame 4. For example, an electric motor as an in-wheel motor may be incorporated in the rear wheel 3, or the motor unit 16 may be located between the seat 11 and the pivot shaft 91. It is desirable that the battery case 8 be located so as to be inclined diagonally relative to the vertical direction. However, the battery case 8 may be located along the vertical direction.

The battery case 8 may be located at another position. The position at which the motor unit 16 is fixed to the frame may be another position and may be arbitrarily selected.

The following aspects disclose preferred embodiments.

First Aspect

A straddle electric vehicle including:
- a vehicle body frame including
  - a head pipe inside which a steering shaft is located and
  - a front frame extending rearward from the head pipe;
- a battery case supported by the vehicle body frame; and
- a motor case located behind the battery case and accommodating an electric motor that generates driving force by which a wheel is driven, wherein
- the front frame includes
  - at least one lower-rear supporting portion supporting a bottom surface of the battery case and
  - at least one motor fixing portion adjacent to the lower-rear supporting portion and fixed to the motor case.

According to this configuration, a position at which the front frame supports the bottom surface of the battery case and a position at which the front frame is fixed to the motor case are adjacent to each other. Therefore, inertial force of the battery case is suitably transmitted to the motor fixing portion. Thus, an increase in size of the vehicle body frame is suppressed, and the vehicle body frame can suitably support the battery case.

Second Aspect

The straddle electric vehicle according to the first aspect, wherein the battery case is inclined relative to a vertical direction so as to extend diagonally toward a front-lower side.

According to this configuration, the motor case can adequately bear the load of the battery, and therefore, the weight of the front frame can be reduced.

Third Aspect

The straddle electric vehicle according to the first or second aspect, wherein:
- the vehicle body frame includes a left frame and a right frame which are located away from each other in a left-right direction;
- the at least one lower-rear supporting portion includes a lower-rear supporting portion of the left frame and a lower-rear supporting portion of the right frame;
- the at least one motor fixing portion includes a motor fixing portion of the left frame and a motor fixing portion of the right frame;
- the motor case includes a front fixing portion; and
- the motor fixing portion of the left frame and the motor fixing portion of the right frame are coupled to each other through the front fixing portion of the motor case.

According to this configuration, the front fixing portion of the motor case serves as the cross frame. Therefore, the lower-rear supporting portion of the front frame can be prevented from bending.

Fourth Aspect

The straddle electric vehicle according to the third aspect, wherein:

the vehicle body frame includes a first cross frame located in front of the battery case and coupling the left frame and the right frame and a second cross frame located behind the battery case and coupling the left frame and the right frame; and the first cross frame is located higher than the motor fixing portions and lower than the second cross frame.

According to this configuration, in a side view of the vehicle, three points that are the first cross frame, the second cross frame, and the front fixing portion of the motor case which serves as a cross frame are located so as to surround the battery case. Therefore, the deformation of the front frame by which the left frame and the right frame approach each other is suitably prevented, and the battery case can be satisfactorily protected.

Fifth Aspect

The straddle electric vehicle according to any one of the first to fourth aspects, wherein:

the front frame includes a left frame and a right frame which are located away from each other in a left-right direction;

the at least one lower-rear supporting portion includes a lower-rear supporting portion of the left frame and a lower-rear supporting portion of the right frame;

the at least one motor fixing portion includes a motor fixing portion of the left frame and a motor fixing portion of the right frame; and each of the left frame and the right frame includes a longitudinal frame extending in a front-rear direction, the motor fixing portion projecting in a left-right direction from a rear end portion of the longitudinal frame, and the lower-rear supporting portion joined to both of the longitudinal frame and the motor fixing portion.

According to this configuration, the rigidity of the lower-rear supporting portion increases, and therefore, the battery case can be stably supported.

Sixth Aspect

The straddle electric vehicle according to any one of the first to fifth aspects, further including a support supporting a front end portion of a lower surface of the battery case, wherein:

the lower surface of the battery case extends diagonally toward a lower-rear side;

the front frame extends diagonally toward the lower rear side;

in a side view of the vehicle, a front-lower portion of the battery case projects downward from the front frame; and the support is coupled to the front frame.

According to this configuration, both of the improvement of the traveling stability by lowering the center of gravity of the battery and the weight reduction of the front frame can be realized.

Seventh Aspect

The straddle electric vehicle according to the sixth aspect, wherein:

the support includes a lower-front supporting portion located at a lower side of a front end portion of a lower surface of the battery case and arm portions extending upward from both left-right direction ends of the lower-front supporting portion toward the front frame; and the arm portions extend diagonally toward a rear-upper side and are inclined relative to a perpendicular direction of a supporting surface of the lower-front supporting portion.

According to this configuration, the support can satisfactorily receive a load applied from a front-lower side toward a rear-upper side through the front wheel during traveling.

Eighth Aspect

The straddle electric vehicle according to any one of the first to seventh aspects, further including an upper cover that closes an upper opening of the battery case and is fixed to the vehicle body frame, wherein:

the battery case is fixed to the vehicle body frame through the upper cover.

According to this configuration, the battery case can be stably supported.

Ninth Aspect

The straddle electric vehicle according to any one of the first to eighth aspects, further including a power supply cable extending from the battery case to the motor case, wherein:

a rear surface of the battery case includes a cable passing opening through which the power supply cable passes; and a lower end of the motor case is located lower than the cable passing opening of the battery case.

According to this configuration, since the battery case covers the power supply cable from front, the exposed power supply cable can be protected by the battery case. Moreover, since the lower surface of the motor case is located lower than the cable passing opening, the motor case can protect the power supply cable from obstacles on a road surface.

Tenth Aspect

A straddle electric vehicle including:

a vehicle body frame including a head pipe inside which a steering shaft is located and a front frame extending rearward from the head pipe; and a battery case that is supported by the vehicle body frame, is inclined relative to a vertical direction, and extends toward a front-lower side, wherein the front frame includes a lower-rear supporting portion supporting a rear end portion of a lower surface of the battery case.

According to this configuration, the inclined battery case can be effectively supported.

What is claimed is:

1. A straddle electric vehicle comprising:

a vehicle body frame including:

a head pipe inside which a steering shaft is located and a front frame extending rearward from the head pipe;

a battery case supported by the vehicle body frame and inclined relative to a vertical direction so as to extend diagonally toward a front-lower side; and a motor case located behind the battery case and accommodating an electric motor that generates driving force by which a wheel is driven, wherein the front frame includes:

at least one lower-rear supporting portion supporting a bottom surface of the battery case; and at least one motor fixing portion adjacent to the lower-rear supporting portion and fixed to the motor case, a rear surface of the battery case is inclined such that, in a side view of the vehicle, the rear surface extends forward as the rear surface extends downward, a front end of the motor case is located in front of an upper end of the rear surface of the battery case, and a lower end of the battery case is located lower than an upper end of the motor case.

2. The straddle electric vehicle according to claim 1, wherein the vehicle body frame includes a left frame and a right frame which are located away from each other in a left-right direction, the at least one lower-rear supporting portion includes a lower-rear supporting portion of the left frame and a lower-rear supporting portion of the right frame, the at least one motor fixing portion includes a motor fixing portion of the left frame and a motor fixing portion of the right frame, the motor case includes a front fixing portion, and the motor fixing portion of the left frame and the motor fixing portion of the right frame are coupled to each other through the front fixing portion of the motor case.

3. The straddle electric vehicle according to claim 2, wherein the vehicle body frame includes:

a first cross frame located in front of the battery case and coupling the left frame and the right frame; and a second cross frame located behind the battery case and coupling the left frame and the right frame, and the first cross frame is located higher than the motor fixing portions and lower than the second cross frame.

4. The straddle electric vehicle according to claim 1, wherein the front frame includes a left frame and a right frame which are located away from each other in a left-right direction, the at least one lower-rear supporting portion includes a lower-rear supporting portion of the left frame and a lower-rear supporting portion of the right frame, the at least one motor fixing portion includes a motor fixing portion of the left frame and a motor fixing portion of the right frame, and each of the left frame and the right frame includes:

a longitudinal frame extending in a front-rear direction;

the motor fixing portion projecting in a left-right direction from a rear end portion of the longitudinal frame; and the lower-rear supporting portion joined to both of the longitudinal frame and the motor fixing portion.

5. The straddle electric vehicle according to claim 1, further comprising a support supporting a front end portion of the bottom surface of the battery case, wherein the bottom surface of the battery case extends diagonally toward a lower-rear side, the front frame extends diagonally toward the lower rear side, in the side view of the vehicle, a front-lower portion of the battery case projects downward from the front frame, and the support is coupled to the front frame.

6. The straddle electric vehicle according to claim 1, further comprising an upper cover that closes an upper opening of the battery case and is fixed to the vehicle body frame, wherein the battery case is fixed to the vehicle body frame through the upper cover.

7. The straddle electric vehicle according to claim 6, wherein an upper end of the upper cover is located above an upper end of the vehicle body frame.

8. The straddle electric vehicle according to claim 1, further comprising a power supply cable extending from the battery case to the motor case, wherein the rear surface of the battery case includes a cable passing opening through which the power supply cable passes, and a lower end of the motor case is located lower than the cable passing opening of the battery case.

9. The straddle electric vehicle according to claim 1, wherein the bottom surface of the battery case is inclined such that the bottom surface extends downward as the bottom surface extends rearward from its front end.

10. The straddle electric vehicle according to claim 9, wherein the lower-rear supporting portion supports a lower end portion of the bottom surface of the battery case.

11. The straddle electric vehicle according to claim 1, wherein the motor fixing portion supports the battery case at a rear-lower end of the battery case and supports the battery case at a position above the lower end of the motor case.

12. The straddle electric vehicle according to claim 1, wherein the vehicle body frame includes:

a left frame and a right frame which are located away from each other in a left-right direction;

a first cross frame located in front of the battery case and coupling the left frame and the right frame; and a second cross frame located behind the battery case and coupling the left frame and the right frame, the at least one motor fixing portion includes a motor fixing portion of the left frame and a motor fixing portion of the right frame, the motor case includes a front fixing portion, the motor fixing portion of the left frame and the motor fixing portion of the right frame are coupled to each other through the front fixing portion of the motor case, and in the side view of the vehicle, a center of gravity of the battery case is located in a triangular region defined by straight lines connecting the first cross frame, the second cross frame, and the front fixing portion of the motor case.

13. A straddle electric vehicle comprising:

a vehicle body frame including:

a head pipe inside which a steering shaft is located and a front frame extending rearward from the head pipe;

a battery case supported by the vehicle body frame;

a motor case located behind the battery case and accommodating an electric motor that generates driving force by which a wheel is driven; and a support coupled to the front frame and supporting a front end portion of a bottom surface of the battery case, wherein the front frame includes:

at least one lower-rear supporting portion supporting the bottom surface of the battery case; and at least one motor fixing portion adjacent to the lower-rear supporting portion and fixed to the motor case, the support includes:

a lower-front supporting portion located at a lower side of the front end portion of the bottom surface of the battery case; and arm portions extending upward from both left-right direction ends of the lower-front supporting portion toward the front frame, and the arm portions extend diagonally toward a rear-upper side and are inclined relative to a perpendicular direction of a supporting surface of the lower-front supporting portion.

14. A straddle electric vehicle comprising:

a vehicle body frame including:

a head pipe inside which a steering shaft is located; and a front frame extending rearward from the head pipe;

a battery case supported by the vehicle body frame; and a motor case located behind the battery case and accommodating an electric motor that generates driving force by which a wheel is driven, the motor case including a front fixing portion, wherein the front frame includes:

a left frame and a right frame which are located away from each other in a left-right direction;

a lower-rear supporting portion located on the left frame and supporting a bottom surface of the battery case;

a lower-rear supporting portion located on the right frame and supporting the bottom surface of the battery case;

a motor fixing portion of the left frame which is adjacent to the lower-rear supporting portion of the left frame and fixed to the motor case; and a motor fixing portion of the right frame which is adjacent to the lower-rear supporting portion of the right frame and fixed to the motor case, the motor fixing portion of the left frame and the motor fixing portion of the right frame are coupled to each other through the front fixing portion of the motor case, the vehicle body frame further includes:

a first cross frame located in front of the battery case and coupling the left frame and the right frame; and a second cross frame located behind the battery case and coupling the left frame and the right frame, and in a side view of the vehicle, a center of gravity of the battery case is located in a triangular region defined by straight lines connecting the first cross frame, the second cross frame, and the front fixing portion.

* * * * *